United States Patent [19]

Hayden et al.

[11] Patent Number: 5,141,274
[45] Date of Patent: Aug. 25, 1992

[54] APPARATUS FOR GRASPING AND HANDLING CUBES OF STACKED PRINTED PRODUCTS

[75] Inventors: William Hayden, Easton; Mark W. Hayden, Monroe; Richard S. White, Old Saybrook, all of Conn.

[73] Assignee: Galpin Research, Limited Partnership, Stratford, Conn.

[21] Appl. No.: 507,396

[22] Filed: Apr. 10, 1990

Related U.S. Application Data

[62] Division of Ser. No. 153,992, Feb. 9, 1988, Pat. No. 4,927,318.

[51] Int. Cl.⁵ .............................................. B65G 57/20
[52] U.S. Cl. .................................... 294/2; 294/87.1; 294/113; 294/119.1; 414/789.5; 414/792.9; 414/796.9
[58] Field of Search ................. 294/67.33, 87.1, 113, 294/119.1, 2; 414/796, 796.9, 797, 929, 621, 622, 623, 731, 736

[56] References Cited

U.S. PATENT DOCUMENTS

| | | | |
|---|---|---|---|
| 2,661,978 | 12/1953 | Lauro | 294/113 |
| 2,924,484 | 2/1960 | Tolsma | 294/113 X |
| 3,716,148 | 2/1973 | Varga | 414/796.9 |
| 4,400,124 | 8/1983 | Greller | 294/67.33 X |
| 4,592,692 | 6/1986 | Suizu et al. | 294/87.1 X |
| 4,927,318 | 5/1990 | Hayden et al. | 414/786 |

FOREIGN PATENT DOCUMENTS

| | | | |
|---|---|---|---|
| 188987 | 7/1986 | European Pat. Off. | 414/792.9 |
| 3042174 | 6/1982 | Fed. Rep. of Germany | 294/87.1 |
| 876422 | 10/1981 | U.S.S.R. | 294/119.1 |
| 981179 | 12/1982 | U.S.S.R. | 294/113 |

Primary Examiner—Robert J. Spar
Assistant Examiner—Janice Krizek
Attorney, Agent, or Firm—Parmelee, Bollinger & Bramblett

[57] ABSTRACT

The output of a high speed press or bindery is formed into stacks which are then combined into four stack "cubes". The cubes are handled as units and formed into tiers which can be loaded onto pellets. A pickup head for manipulating the cubes is carried by a transport device such as a gantry or robot arm. It has a top plate which is connected to the transport device. The top plate carries horizontal guide members from which depend four side panels. The side panels may be retracted to grasp the sides of the cube or extended to release the cube. Fingers mounted along the bottom edges of the side panels are designed to extend between the bottom sheets of the cube and the surface on which it sits. They can be locked into this position, permitting the cube to be lifted and transported by the pickup head. Also disclosed is a gantry-type transport device with a telescoping extender to which the pickup head is connected.

29 Claims, 21 Drawing Sheets

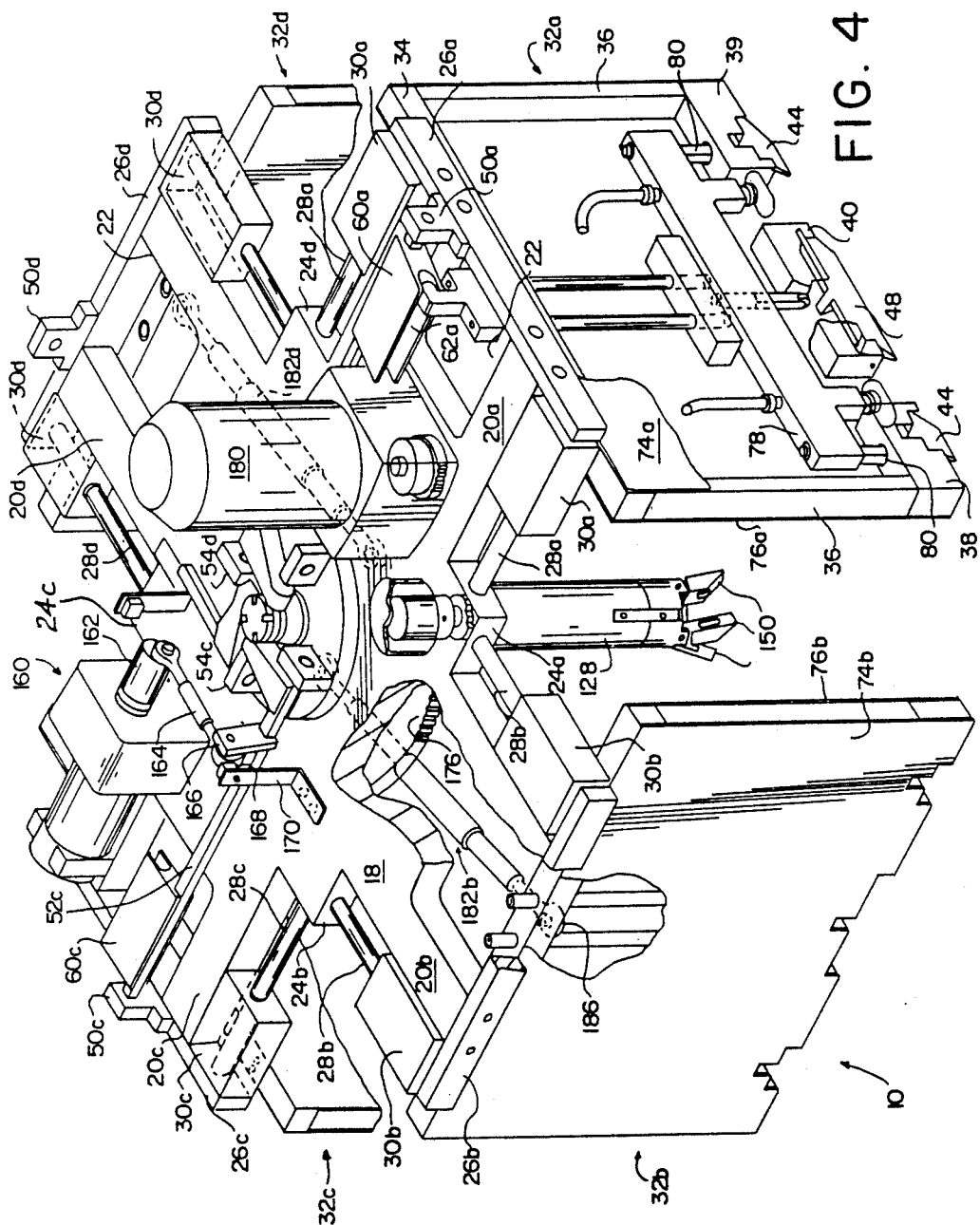

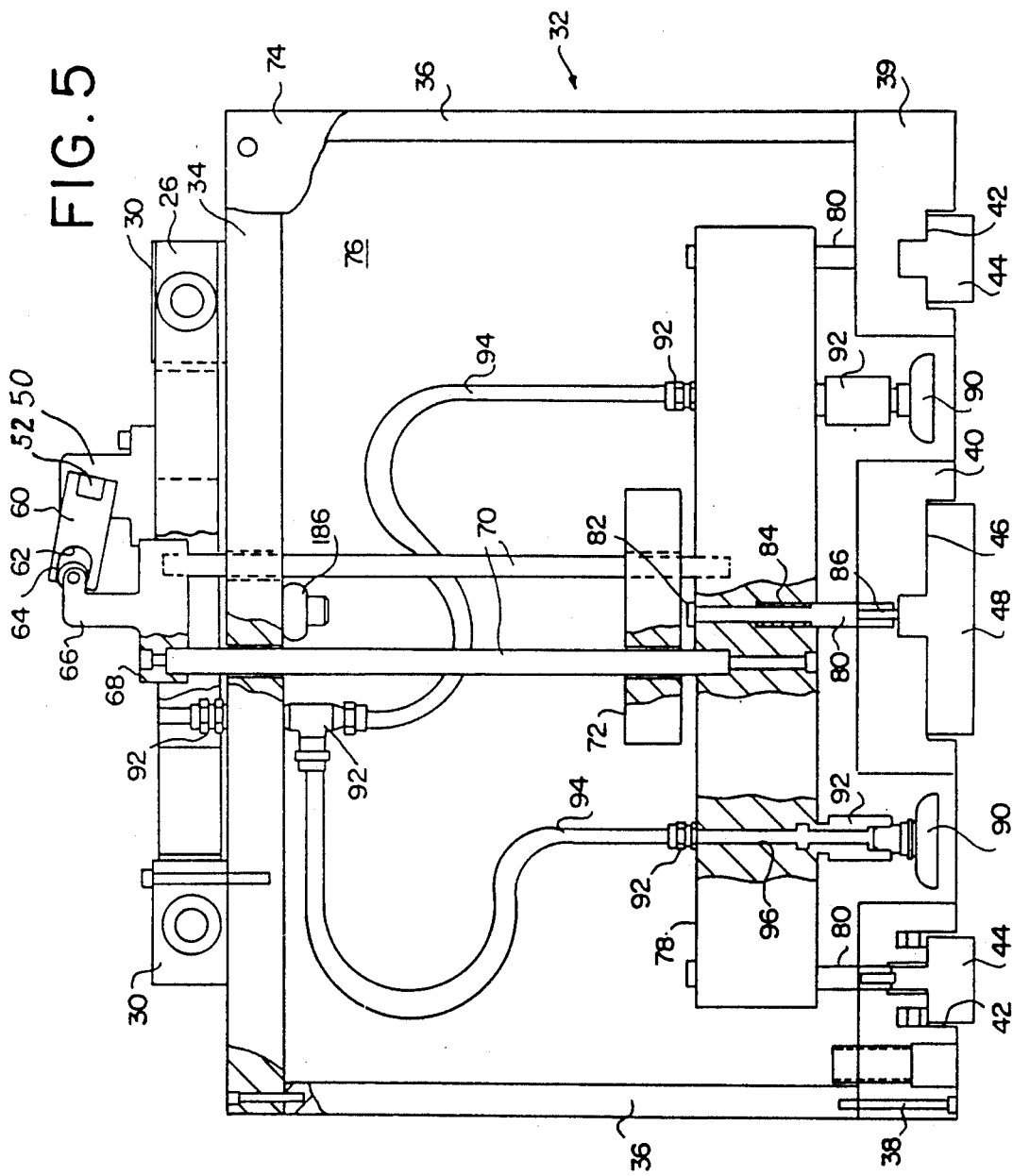

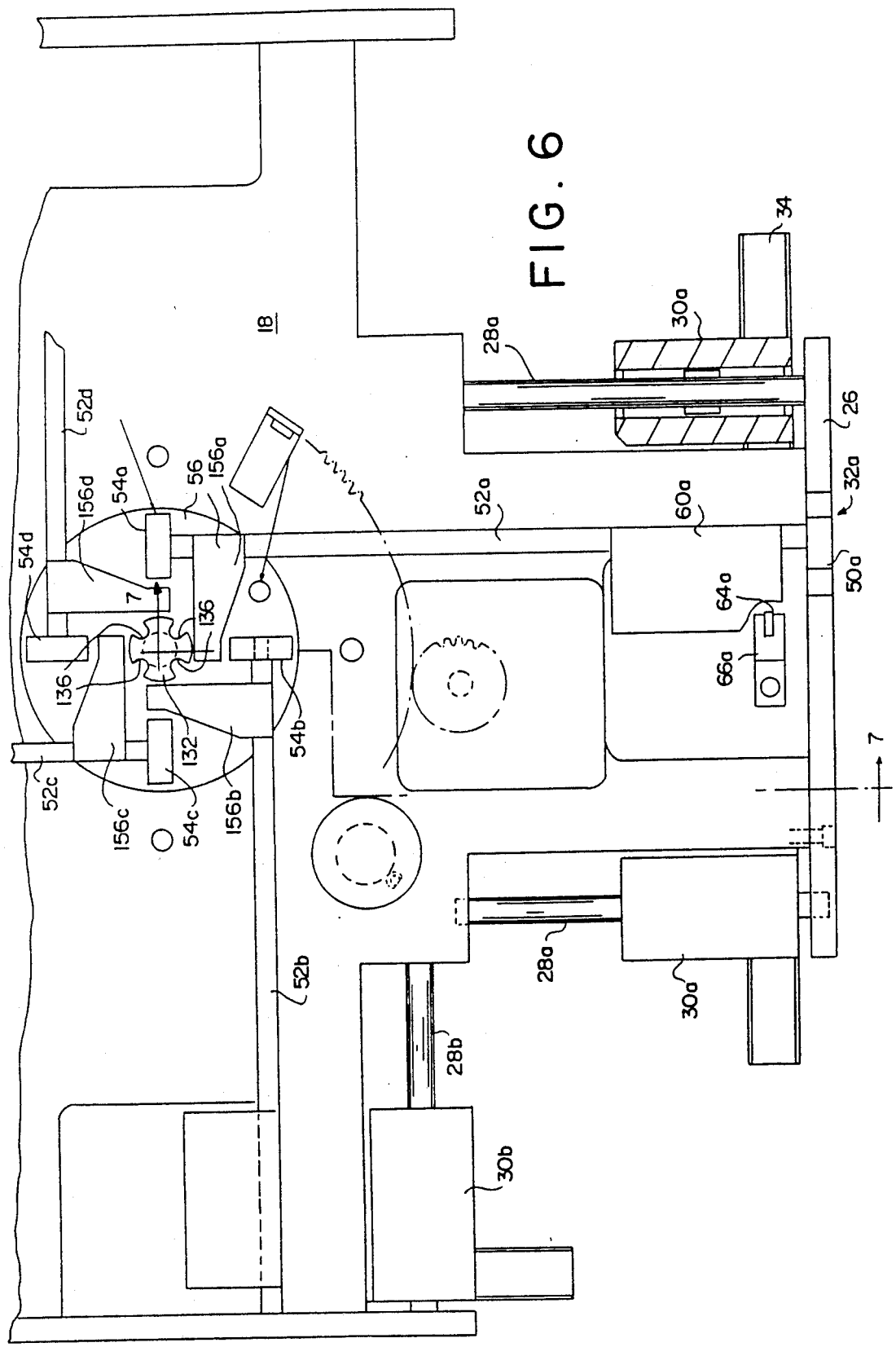

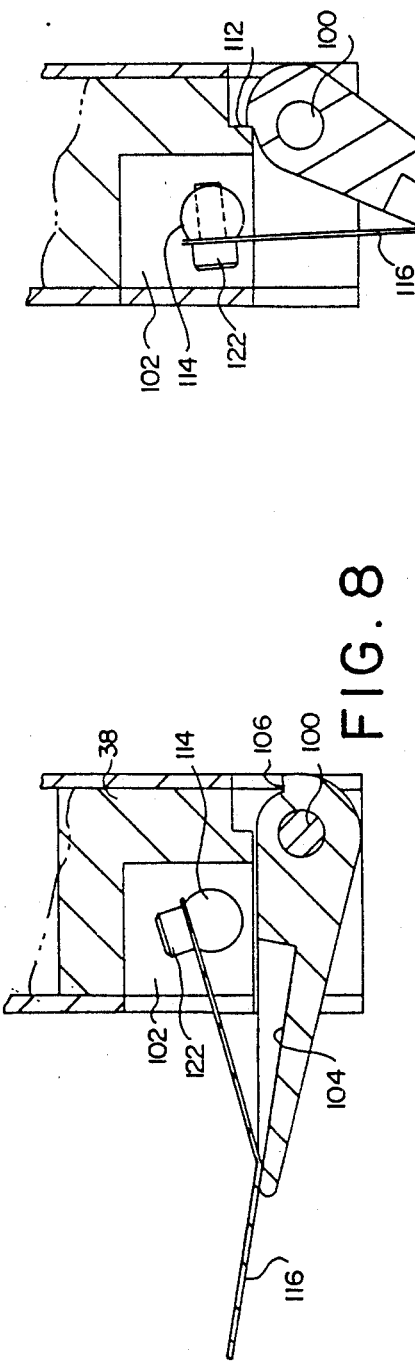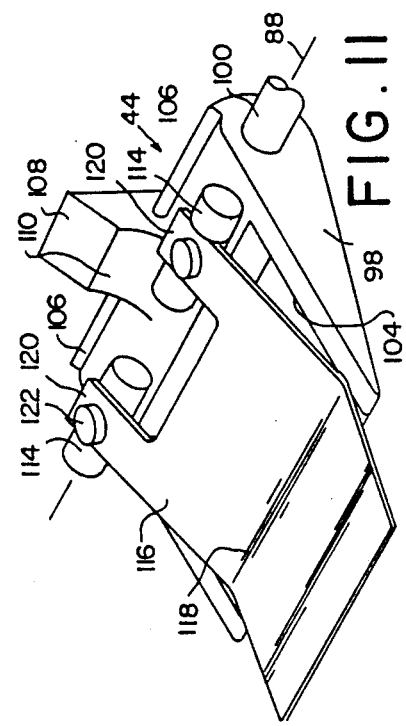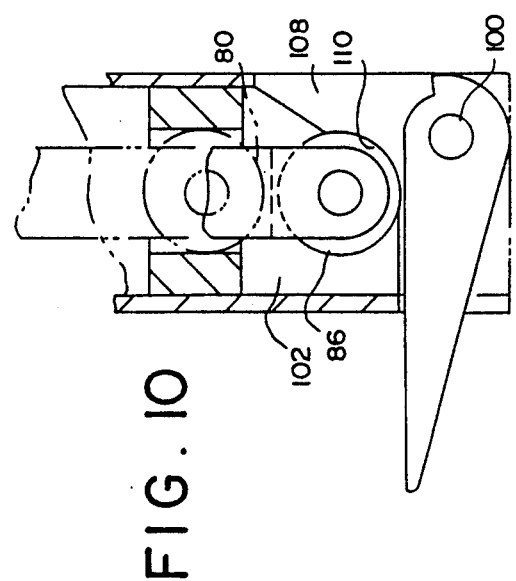

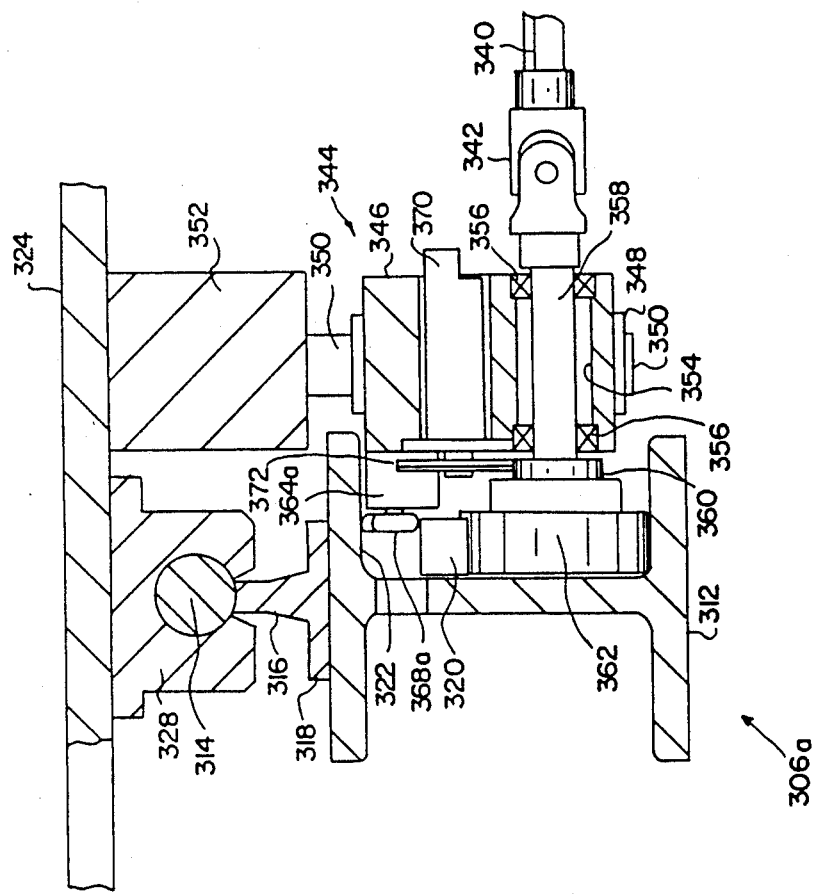
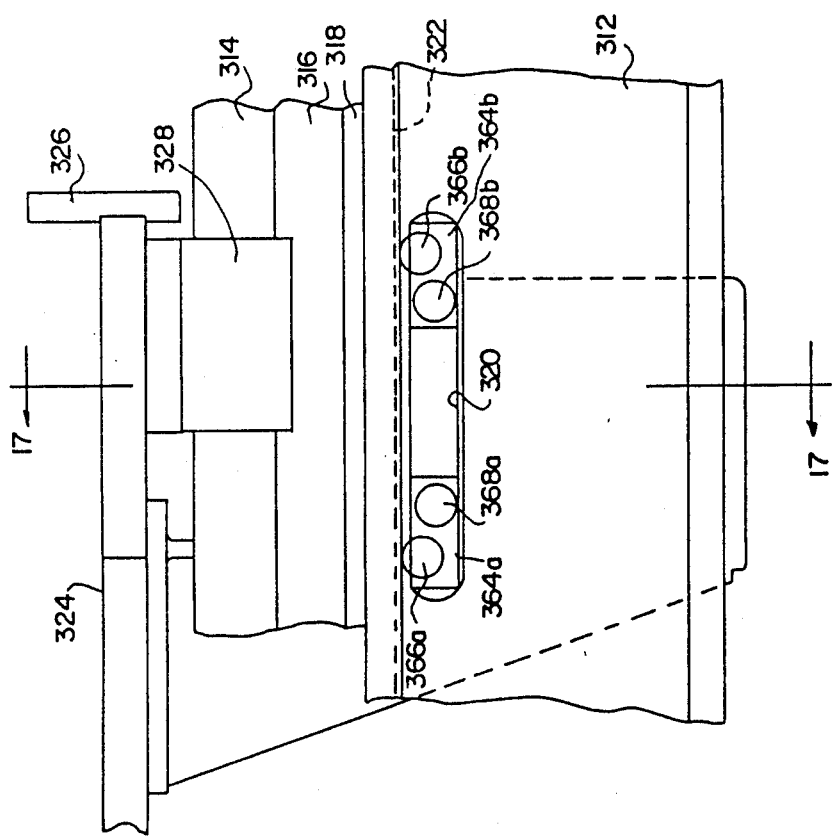

APPARATUS FOR GRASPING AND HANDLING CUBES OF STACKED PRINTED PRODUCTS

RELATED APPLICATION

The present application is a division resulting from a requirement for division which occurred during prosecution of parent application Ser. No. 07/153,992, filed Feb. 9, 1988, and issued as U.S. Pat. No. 4,927,318, on May 22, 1990.

TECHNICAL FIELD

This invention relates to the material handling field. More particularly, it comprises method, apparatus, and system for grasping, handling, transporting, and repositioning "cubes" of stacked printed products such as newspapers, magazines, booklets, and brochures produced by a high-speed printing press or bindery line.

BACKGROUND

In co-pending application Ser. No. 07/142,736, filed Jan. 11, 1988, and issued as U.S. Pat. No. 4,934,687 on Jun. 19, 1990, of Hayden et al., assigned to the same assignee as the present invention, there is disclosed a high-speed stacker. A stacker forms neat, stable, precisely aligned stacks of printed products from a high-speed press or bindery line. The products may comprise items such as printed book or magazine signatures, newspaper sections, magazine sections, inserts, etc. The stacker is capable of handling the output of a press producing as many as 80,000 such products per hour. It is among the objects of the present invention to provide a method, apparatus, and system for lifting and moving stacks for further processing. More specifically, the apparatus is designed to manipulate "cubes" consisting of four such stacks. The manner in which this is accomplished will become apparent from the following description, the accompanying drawings, and the appended claims.

DISCLOSURE OF INVENTION

The invention comprises a method, apparatus, and system for forming four stacks of printed products into a "cube" which is convenient for grasping and handling. It utilizes a pickup head for manipulating the cube. The pickup head is suspended from a transporter such as, for example, a gantry or a robot arm. The pickup head includes a substantially horizontal top plate which is engageable by the transporter. At least four guide members are carried by the top plate and extend horizontally therefrom in mutually perpendicular directions. Depending from the top plate are four vertical side panels, each supported respectively by a different one of the guide members and horizontally movable therealong between an extended release position and a retracted grasping position. The side panels thereby bound a rectangular volume of variable dimensions. Means are provided for moving each of the side panels between its extended and retracted position. The bottom of each of the side panels carries means for extending beneath and supporting a stack of material to be lifted. Each of the side panels also carries means for locking its supporting means into supporting position when the side panel is in a grasping position and releasing the supporting means when it is in a released position.

BRIEF DESCRIPTION OF THE DRAWINGS

FIG. 4 is a perspective view of a pickup head in accordance with this invention, portions thereof being broken away to illustrate its internal construction.

FIG. 5 is an elevational view of one of the side panels, portions thereof being broken away to illustrate its internal construction.

FIG. 6 is a partial plan view of the pickup head of this invention.

FIG. 8 is an enlarged elevational view of a support finger in its support position, i.e. for supporting a cube of printed products.

FIG. 9 is a view similar to FIG. 8 illustrating the support finger in its released position.

FIG. 10 is an elevational view of a support finger and locking member.

FIG. 11 is a perspective view of one of the support fingers of the invention.

FIG. 16 is an enlarged left side view of a portion of the gantry rail and carriage of FIGS. 14 and 15.

FIG. 17 is a cross section taken substantially along the line 17—17 of FIG. 16.

BEST MODE FOR CARRYING OUT THE INVENTION

Figure 1:
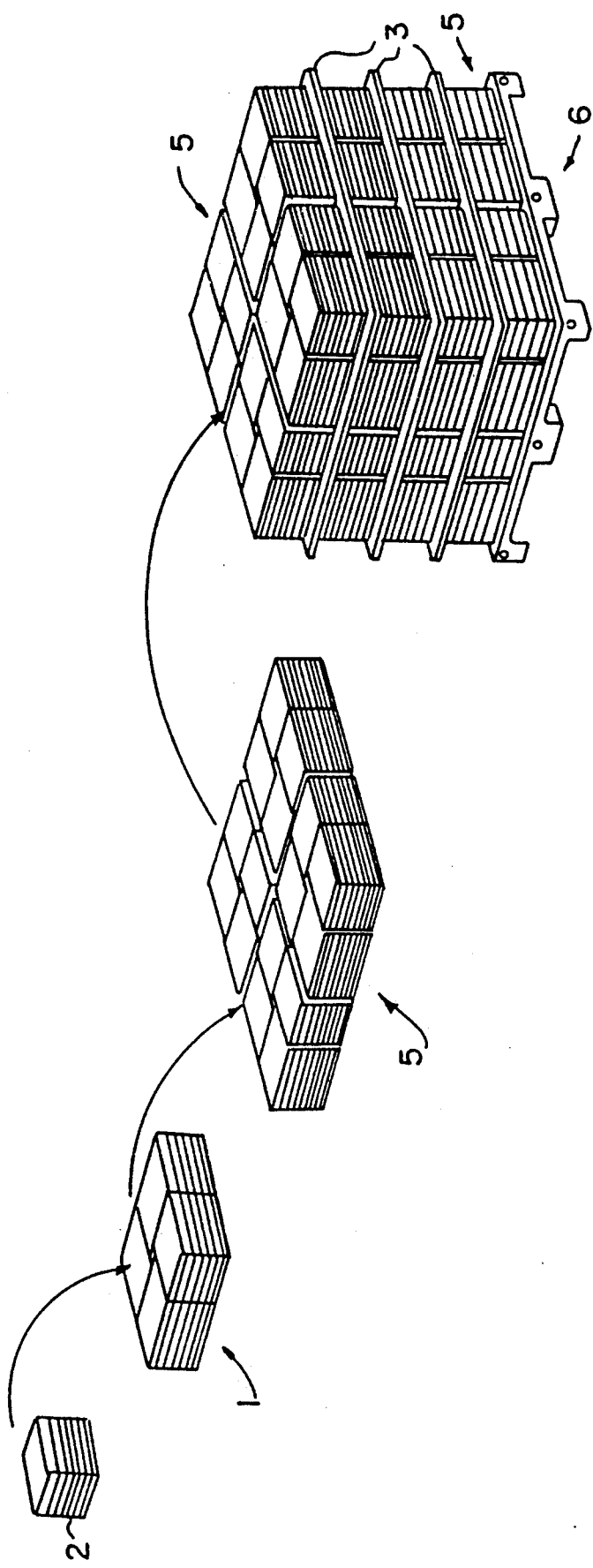
FIG. 1 illustrates the evolution from a stack of printed material to a five tier pallet load.
Figure 3:
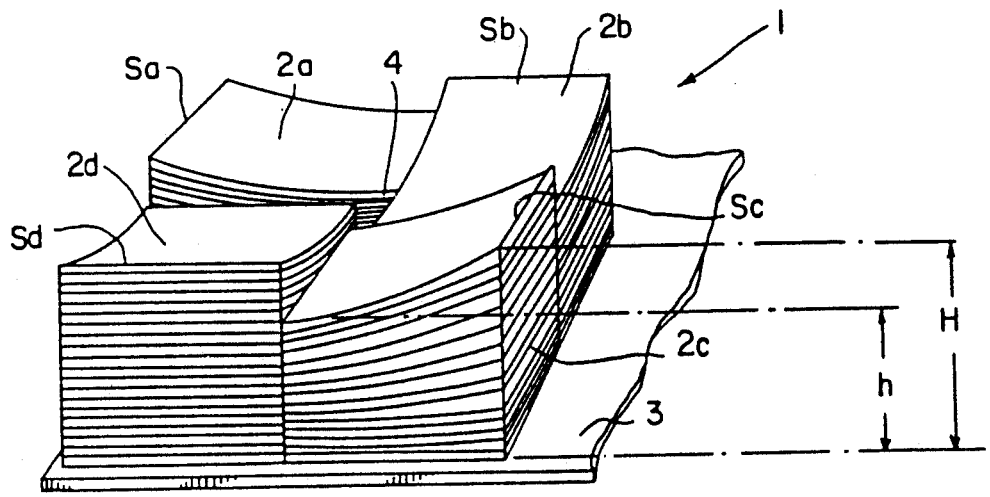
FIG. 3 is a perspective view of a "cube" of printing press product to be moved.

Illustrated in FIG. 1 and in more detail in FIG. 3, is a "cube" 1 of stacked materials such as newspapers, magazines, pamphlets, brochures, signatures, etc. comprising the output of a high-speed printing press or bindery line. The so-called "cube" may, in actuality, not be cubic. It is formed from four stacks 2a–d of signatures or other printed products which might be formed, for example, by the stacker of the above-referenced co-pending application. Each stack is aligned at 90° to either of its adjoining stacks. This is of particular importance in the case of folded material such as signatures, newspapers or newspaper sections, etc. each of which may comprise a number of pages folded to form a spine. The spine portion of each folded printed product is thicker than the opposite edge due to the inherent behavior of the folded layers of paper in the spine. Therefore, when similar folded printed products are assembled into a single stack, the stack will be higher along the one edge where the fold is located. The 90° rotation between the adjacent stacks 2a–d, which is clearly illustrated in FIG. 3, provides a stable assembly convenient for subsequent automatic grasping, handling and for assembling with other cubes to form a "tier", upon which to place a separator such as for example, a sheet of plywood, fiber board, particle board or stiff plastic upon which a subsequent tier of cubes can be assembled.

An overall objective of this invention is illustrated in FIG. 1. It is: to assemble stacks 2 of printed material arriving from the stacker end of a high speed press or bindery line into cubes 1; to assemble cubes 1 into tiers 5; and to stack the tiers 5 onto a pallet 6, with the respective tiers being separated by separators 3. The actual process is illustrated more realistically in FIG. 2 which shows the stacks 2 being transferred from a conveyor 7 by a pusher 8 onto a turntable 9 of a cube builder station 11. The turntable 9 rotates 90° receiving the respective stacks so as to orient them as shown in FIG. 3 with their respective spines in the same relative positions to provide substantially coplanar support surfaces $S_a$–$S_d$. Each completed cube 1 is then lifted by a pickup head 10 controlled by a suitable manipulator or other overhead lifting, moving and positioning apparatus 12 and is moved to the locality of the pallet 6 being loaded. The first four cubes are positioned on the pallet to form a first tier 5. A separator 3 is positioned atop the first tier—this may be done by the pickup head 10, as will be explained below. Tiers 5 and separators 3 are alternated until the desired pallet load is reached. The loaded pallet is then removed and replaced by a new one.

Cube Formation

The cube 1 of FIG. 3 is shown resting upon a separator 3 which may be simply a sheet of plywood, or the like. It will also be noted that cube 1 is formed from stacks of folded printed products which are rectangular but not square. Accordingly, when assembled in the position illustrated, they form a central opening 4. It will be apparent, however, that if the signatures were square, there would be no such opening. The pickup head 10 portion of this invention is designed to grasp and manipulate such a cube with or without such a central opening 4.

The cube 1 of FIG. 3, comprising the four adjacent stacks 2a, 2b, 2c, and 2d in the same relative positions, i.e. in corresponding orientations around the four sides and corners of the cube, is advantageously quite stable. The reasons for this stability of the assembled cube 1 will now be explained with reference also to FIG. 3A. Each of the respective stacks has an end and a side pressed against a respective side and an end of adjacent stacks. For example, taking a look at stack 2a, the reader sees that the end surface 14 of this stack 2a abuts against the side surface of an adjacent stack 2d, while the side surface 16 of this stack 2a abuts against the end surface of another adjacent stack 2b. It is to be noted that these side and end surfaces are not smooth planes. Rather, these side and end surfaces comprise numerous edges of sheets (pages) of the printed products.

Figure 3A:
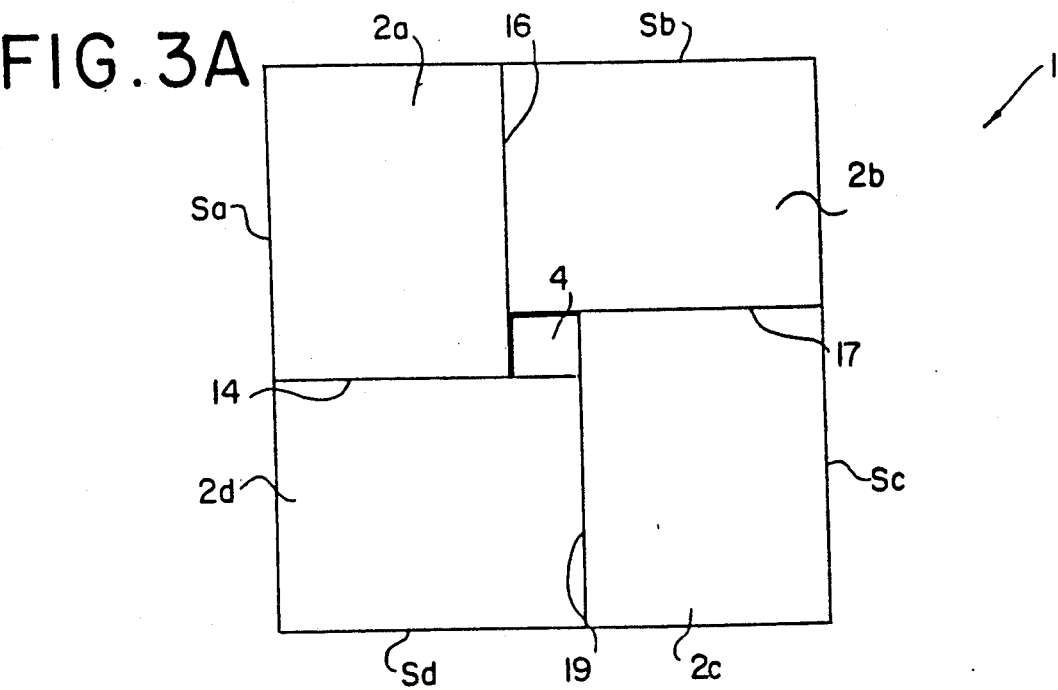
FIG. 3A is a top view of a typical cube, for example formed by four stacks of newspapers.

The presently preferred orientation for each of the stacks in a cube 1 is shown in FIGS. 3 and 3A; namely, the respective folded (spine) edges of the printed products in each stack face the outsides of the cube. The margin of a printed product opposite to the "spine" side is called the "lap" side. Thus, with these four stacks 2a–d in their presently preferred orientation the "lap" edges of sheets (pages) along the stack side 16 are pressing against the end edges of sheets (pages) of the printed products in the adjacent stack 2b. At the same time, the ends of the pages at 14 are pressing against the "lap" edges of the pages of the other adjacent stack 2d.

The "lap" edges and end edges of the numerous pages in the abutting stacks of printed products are not exactly aligned. Some edges protrude slightly more than others. Thus, edges or portions of edges of numerous pages along the abutting areas 14 and 16 are slightly interdigitated or interengaged, thereby providing stabilizing mutual support among the stacks. Furthermore, as will be appreciated by looking closely at FIG. 3, the edges of pages along the "lap" side of each stack are generally lying very nearly horizontal. However, the edges of the pages along the ends of the stack are sloping somewhat due to the differential in heights of the spine and "lap" sides. Thus, there is an interdigitation between horizontal portions of edges and sloping edges of pages. These sloping edges act in the nature of diagonal ties which interlock with the horizontal edges and provide diagonal bracing to the assembled cube. In effect, the assembled cube 1 has multitudes of interlocked diagonal braces extending along each of the four abutting areas 14, 16, 17 and 19 for advantageously stabilizing the whole cube in all directions.

Inviting attention again to FIG. 3, the spine side height of a stack is shown as "H" and the lap side height as "h". Because the spines are all on the same side of each stack, the stack curves up or flares up toward the spine side S, thus creating a significant height differential (H−h). This differential of (H−h) increases generally in proportion to the spine height "H". Thus, the usual practical maximum limit to the height "H" is about 15 inches. The presently preferred spine side height "H" is in the range of about 7 inches to about 11 inches. The corresponding lap side height "h" is then in the range of about 6 inches to about 10 inches.

Pickup Head

FIG. 4 illustrates a pickup head 10 constructed in accordance with the present invention. It comprises a top plate 18 of generally cruciform construction having arms 20a–d, each of which is forked to provide a central opening 22. At the junctures of the respective arms are square projections 24a–d.

Mounted to the end of each of the arms 20 is a crossbar 26a-d. Both ends of each crossbar 26 extend outwardly from the respective arm 20 so as to support between such ends and aligned projections 24a-d, pairs of guide rods 28a-d. Mounted for linear movement along each pair of guide rods 28 is a pair of bearing blocks 30a-d. Depending from each pair of bearing blocks 30 is a corresponding side panel 32a-d.

Side panels 32 are of identical construction. As shown most clearly in FIGS. 4 and 5, each includes a rectangular outer frame comprising a head bar 34 bolted to the bearing blocks 30 and a pair of side bars 36. The lower edge of each side panel comprises (1) end bars 38, 39, each connected to, and extending inwardly from, a respective one of side bars 36 and (2) a central bar 40. The end bars 38, 39 are machined to provide openings 42 within which are mounted fingers 44. The central bar 40 is similarly machined to have a larger opening 46 within which is mounted a finger 48. The function of these fingers and the manner in which they operate will be described below.

Figure 7:
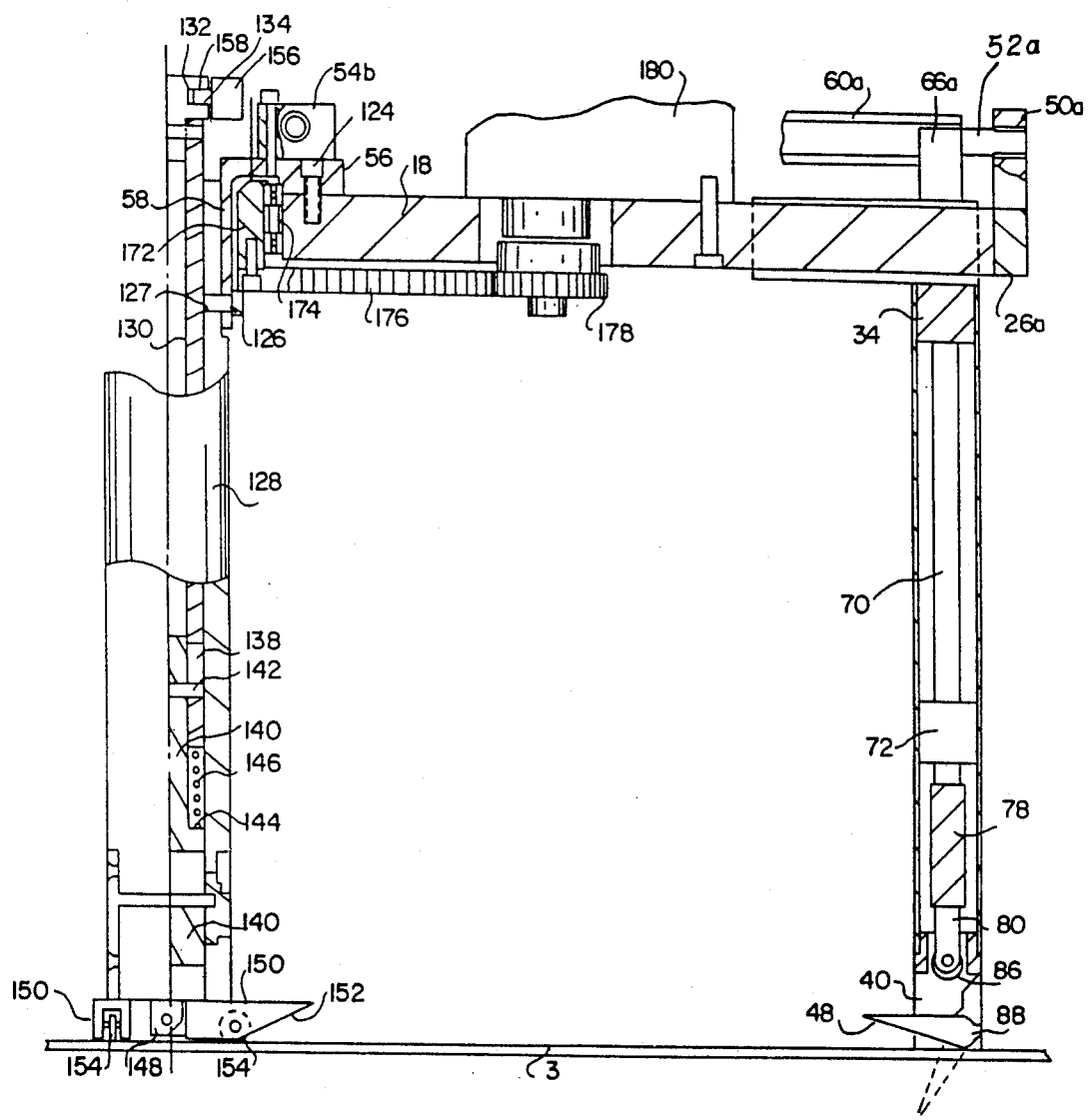
FIG. 7 is a cross section taken substantially along the line 7—7 of FIG. 6.

Mounted on the top of each of the side panels 32 atop cross bar 26 is a bearing bracket 50 (FIGS. 4, 6 and 7) which rotatably supports the rounded end of a generally square drive rod 52 (FIG. 6). The opposite end of each drive rod 52 is rotatably supported in a bearing block 54. The bearing blocks 54 are mounted on the upper surface of the circular flange 56 of a hollow stub shaft 58 (FIG. 7). Stub shaft 58 extends downwardly through a circular opening in top plate 18 as will be seen by reference to FIG. 7.

Mounted on the outer ends of each of the square drive rods 52 for rotation therewith, is a drive block 60. The block 60 defines a slot 62 extending along one edge and parallel with the drive rod 52. Positioned within the slot 62 of drive block 60, is a cam wheel 64 (FIG. 5) carried by an L-shaped arm 66 extending upwardly from a vertical control block 68. A pair of guide rods 70 hang downwardly from the control block 68, passing through openings in the head bar 34 and a guide block 72. Guide block 72 is mounted between a pair of sheet metal panels 74, 76 which enclose the side panel 32. Mounted to the lower ends of the guide rods 70 is a cross bar 78 (FIG. 5).

Carried by, and extending downwardly from, the cross bar 78 are three locking plungers 80. These three plungers are similarly retained within vertical passages in the crossbar 78. The central plunger 80 is illustrated in FIG. 5. It is vertically slideable within the crossbar 78, but is retained by a nut 82 at its upper end. It is biased resiliently downward by means of a coiled compression spring 84. A roller 86 (see also FIG. 7) is carried by each of the plungers 80 at its lower end. Mounted immediately below each of the locking plungers 80 is one of the fingers 44, 48 mounted for rotation about co-linear horizontal axes. FIG. 7 illustrates central finger 48 mounted for rotation about the axis 88.

In addition to the locking plungers 80, the crossbar 78 carries a pair of depending vacuum cups 90 (FIG. 5). The vacuum cups 90 are connected through suitable fittings 92, tubing 94, and internal passages 96 within the crossbar 78 to a vacuum source (not shown).

The fingers 44, 48 although of different lengths, have essentially the same construction best illustrated in FIGS. 8-11. Each of the locking fingers comprises a tapered body 98 mounted for rotation about a pivot rod 100 extending along the axis 88. The finger 44 and the pivot rod 100 are positioned within a cavity 102 formed within the end bar 38. The central portion of the tapered body 98 is cut away to form a recess 104 in its upper surface. That portion of the tapered body 98 which lies on the opposite side of the pivot rod 100 includes a horizontal shoulder 106 and a central locking leg 108 (FIGS. 10 and 11) substantially perpendicular to the tapered body 98. The inner surface of the locking leg 108 is curved to define a substantially circular locking surface 110. The finger 44 is pivotal about the pivot rod 100 between a raised position as illustrated in FIGS. 8 and 10 and a lowered position shown in FIG. 9 wherein the shoulder 106 abuts against stop surface 112 within the cavity 102. A pair of stub shafts 114 also extend into the cavity 102 from either end. A thin steel insertion leaf 116 is mounted to the stub shafts 114 and lies within the recess 104. As will be apparent from FIG. 11, the insertion leaf 116 is essentially a rectangular sheet bent along a line 118. It includes a pair of spaced arms 120 which are connected to the respective stub shafts 114 by means of bolts 122. The insertion leaf 116 is freely pivotable with the stub shafts 114 and is slideable along the surface of the recess 104 so as to move between a retracted position shown in FIG. 9 and the extended position shown in FIG. 8 as will be later explained.

Turning now to the upper portion of the pickup head 10 of this invention, attention may be directed to FIGS. 4, 6 and 7. As previously explained, a hollow stub shaft 58 (FIG. 7) is mounted to the top plate 18 by means of bolts 124 extending through its flange 56. Secured to stub shaft 58 by a pair of diametrically opposite pins 126, and depending therefrom, is a cylindrical sleeve 128. The pins 126 extend through an L-shaped bayonet slot 127 in the sleeve 128. Positioned within and slideable along the sleeve 128, is a reciprocating shaft 130. Fixedly mounted in the top of the reciprocating shaft 130 is a cylindrical spindle 132 having a peripheral groove 134 in its external surface. The spindle 132 also includes four equally spaced vertical reliefs 136 on its outer surface (FIG. 6).

As will be apparent from FIG. 7, the lower end of reciprocating shaft 130 is substantially above the lower end of the sleeve 128. Near the lower end of the shaft 130 is a vertical slot 138. A tubular pickup element 140 is mounted within the shaft 130 and a pin 142 from element 140 extends into the slot 138. Spaced downwardly from the lower end of the reciprocating shaft 130 is an enlarged portion of the pickup element 140 which slides within the sleeve 128 and defines a circumferential shoulder 144. Mounted between the shoulder 144 and the lower end of the reciprocating shaft 130 is a compression spring 146. The lowermost end of pickup element 140 carries four spaced lugs 148 upon which are hung pivotably mounted fingers 150. Each of the fingers 150 includes a tapered lower surface 152 which defines a recess containing a roller 154. Each of the fingers 150 is movable between a hanging position illustrated in FIG. 4 and a raised position illustrated in FIG. 7.

Turning now to FIG. 6, it will be noted that each of the drive rods 52 carries a crank arm 156. Each crank arm in turn carries a pin 158 which normally rides within the groove 134 of spindle 132 as illustrated in FIG. 7. An up-down drive motor unit 160 is mounted on the top of top plate 18 (FIG. 4). Eccentrically mounted on its output shaft 162 is one end of a crank rod 164. The other end of crank rod 164 connects to a crank lever 166 which is rigidly connected to the drive rod 52. Closely adjacent crank 166 is a position sensor 168 mounted on a bracket 170.

Turning again to FIG. 7, it will be seen that extending around the stub shaft 58 is a second hollow stub shaft 172 which is mounted to top plate 18 by means of a bearing assembly 174. Secured to the bottom of the stub shaft 172 is a gear 176 which is closely adjacent the undersurface of the top plate 18. The gear 176 meshes with a pinion gear 178 which is driven by a side panel drive motor 180 mounted on the upper surface of top plate 18.

Figure 12:
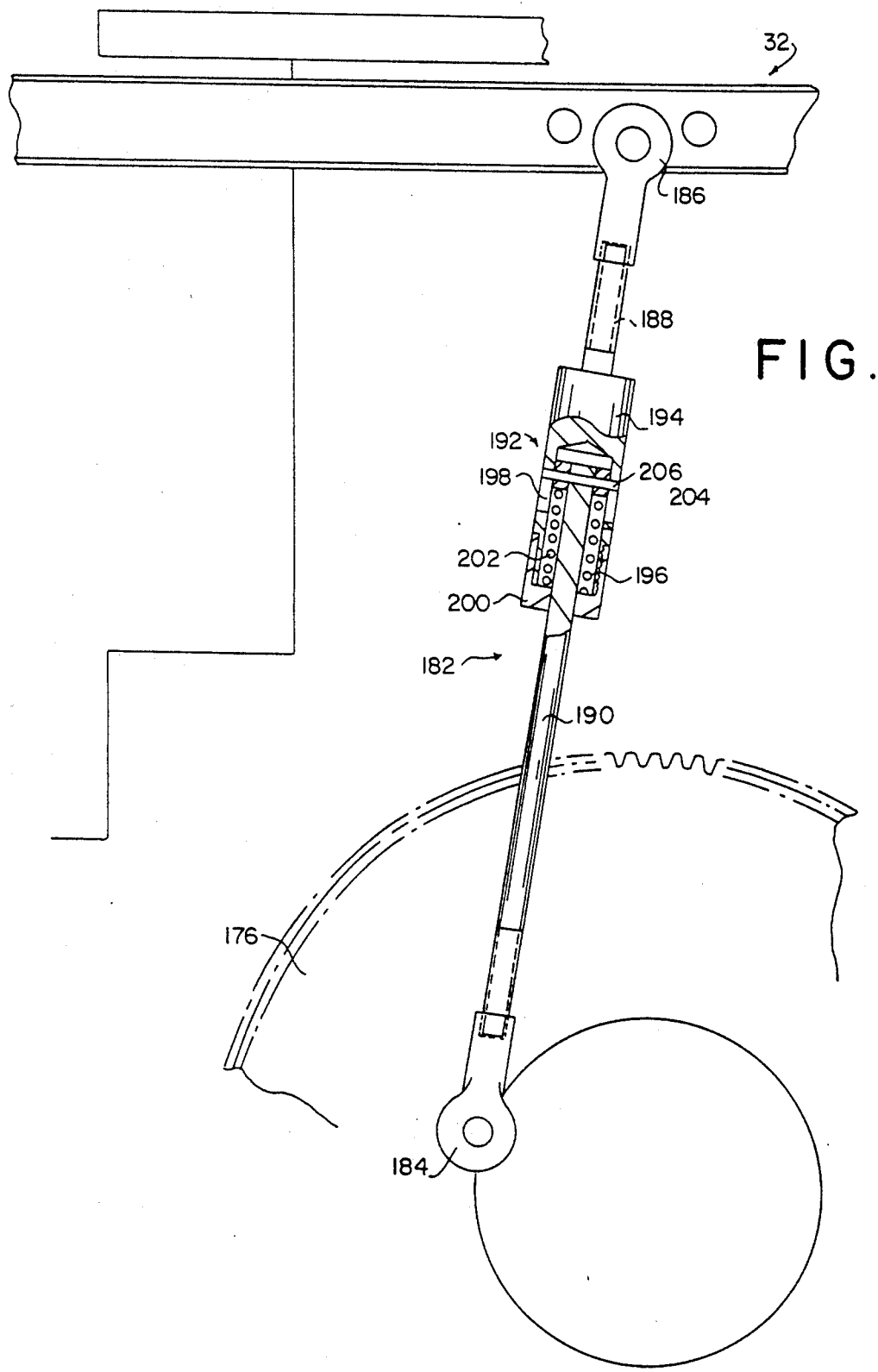
FIG. 12 is a plan view of one of the connecting rods of the invention.

Interconnecting the lower surface of gear 176 and each of the side panels 32 is a respective connecting rod 182 (FIG. 4). The inner ends of the connecting rods 182 are connected to the gear 176 at 90° spaced intervals by means of spherical bearings 184 (FIG. 12). The outer end of each connecting rod 182 is connected to a respective one of the side panels 32 by means of a similar spherical bearing 186. A typical connecting rod is illustrated in FIG. 12. It comprises a connecting rod first segment 188 connected to a connecting rod second segment 190 through a resilient coupling assembly 192. The connecting rod first segment 188 is connected to a cup-shaped body member 194 which terminates at its further end in a threaded male coupling 196. The side wall of the body member 194 defines a pair of aligned vertical slots 198. An internally threaded female coupling member 200 is slipped over the second connecting rod segment 190, followed by a compression coil spring 202, followed by a washer 204. The end of the second rod segment 190 and the washer 204 are both drilled. A connecting pin 206 is passed through the drilled openings so as to extend on either side into the slots 198. The female coupling 200 is then screwed onto the male coupling 196, compressing the spring 202 between it and the washer 204. This construction permits an amount of resilience depending upon the strength of the spring 202.

Gantry

Figure 13:
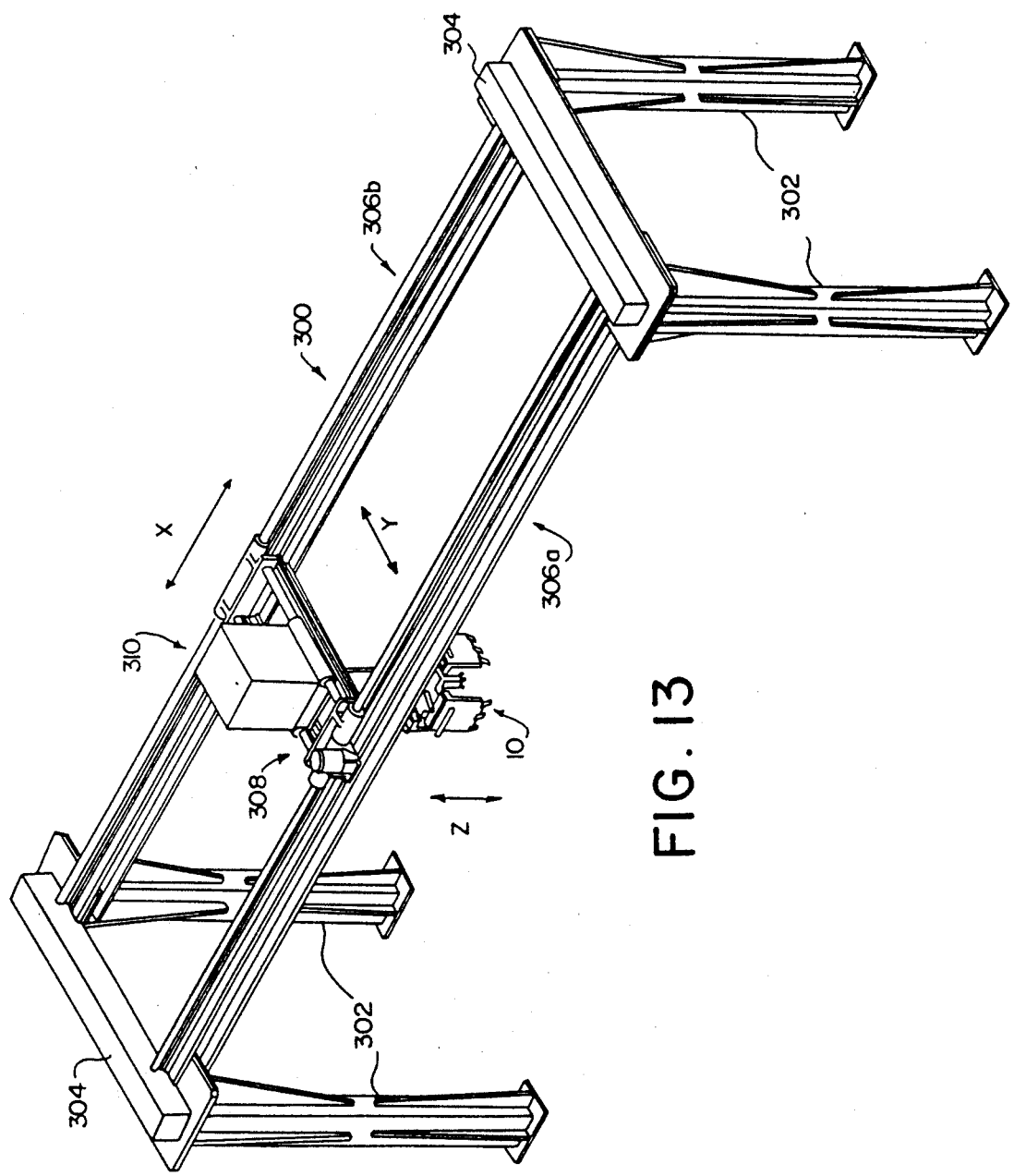
FIG. 13 is a perspective view of a gantry usable in the practice of this invention.

The manipulator for controlling the movement of the pickup head 10 of this invention along X, Y, and Z axes is the gantry 300 illustrated in FIG. 13. As do conventional gantries, it comprises four vertical stanchions 302 in rectangular array. The stanchions at each end of the rectangle are joined by transverse braces 304. Spanning the long dimension of the gantry rectangle are track assemblies 306a, 306b. A transverse track assembly 308 is mounted to travel along the track assemblies 306 to provide movement along the X axis as indicated. A carriage 310 movable along transverse track assembly 308 provides Y axis travel. Vertical (Z axis) movement of pickup head 10 is provided by a Z axis control carried by carriage 310 from which the pickup head is suspended, as will be later described.

The track assemblies 306a,b are substantially identical but in reversed relationship. As will be noted in FIG. 14, each includes an I beam 312 which has mounted upon its upper flange a rail 314 having a head of circular cross section. Except for its circular shape, each of the rails 314 is essentially standard, including a vertical web 316 and a horizontal base 318 which is mounted on the respective I beam 312. Mounted to the inner side of the web of each I beam is a rack gear 320 having the gear teeth on its lower surface and having a flat upper surface spaced below the upper flange of its respective I beam 312a or 312b. The lower surface of the upper flange over each of the racks 320 is ground to provide a flat surface 322 parallel to the upper surface of its respective rack 320.

The transverse track assembly 308 is mounted to travel along the rails 314 in the X axis direction. It comprises a substantially rectangular base plate 324 which spans the distance between the track assemblies 306a,b and includes stiffening ribs 326 on its long edges to prevent sagging. The base plate 324 is movable along the rails 314 by means of four linear ball bushings 328. These bushings are mounted to the bottom of the base plate, two at each end, to engage the rails 314 of the respective track assemblies 306a, 306b.

Propulsion of the transverse track assembly 308 along the track assemblies 306a,b is accomplished by an X drive d.c. servo motor 330 which is mounted adjacent one edge of the base plate 324 at approximately its midpoint. The shaft of the X drive motor 330 extends downwardly through the base plate 324 to a universal coupling 332 which serves to accommodate any slight misalignments. The output from the coupling 332 drives a right angle gear box 334. From the gear box 334, a pair of stub shafts 336a,b extend in opposite directions. Each of stub shafts 336 is connected through a first universal coupling 338, a square drive shaft 340, and a second universal coupling 342, to a drive unit 344.

The two drive units 344 are identical. Each includes a housing block 346 which is mounted by means of linear bearings 348 to "float" on a pair of vertical guide shafts 350 which are fixed to, and extend downwardly from, a mounting block 352 secured to the bottom of base plate 324. Details of the drive unit 344 construction will be apparent from FIG. 17. The lower portion of the housing block 346 defines a shaftway 354 which includes a pair of aligned bearings 356 rotatably supporting a stub shaft 358. One end of stub shaft 358 is secured to the universal coupling 342 and the other end carries a small resolver drive gear 360 and a larger pinion gear 362 spaced therefrom. Pinion gear 362 meshes with the teeth of rack gear 320 mounted on the I beam 312.

A pair of spaced blocks 364a,b on the housing block 346 face the web of I beam 312. Each block carries a pair of rollers—an upper roller 366a,b and a lower roller 368a,b. As will be clear from FIG. 16, the upper rollers 366a, 366b ride on the machined surface 322 on the underside of the upper flange of I beam 312 while the lower rollers 368a, 368b ride on the upper surface of the rack 320. As the rollers are constrained within the confines of the rack and the upper I beam flange, it will be apparent that they will track any sag or misalignment in the track assembly 306. In the course of such tracking, they will guide the housing block vertically along the guide shafts 350 and thereby maintain proper alignment at all times. A further feature of this construction is that either the racks 320 on the two track assemblies 306a, 306b are offset slightly from one another, or the corresponding pinions 362 are slightly offset. In this fashion, X direction backlash is prevented in either direction of movement.

Referring back to FIG. 17, it will be noted that the housing block 346 carries a resolver 370. The resolver is driven by resolver drive gear 360 through a split gear 372. The two halves of the split gear 372 are slightly misaligned so that backlash between it and the resolver drive gear is eliminated in both directions of travel. The resolver 370 includes an internal gear box and is designed to make only one revolution for the entire X travel distance. The output of the resolver 370 is employed to indicate the position of the transverse track assembly 308 along the X axis at any time.

Figure 20:
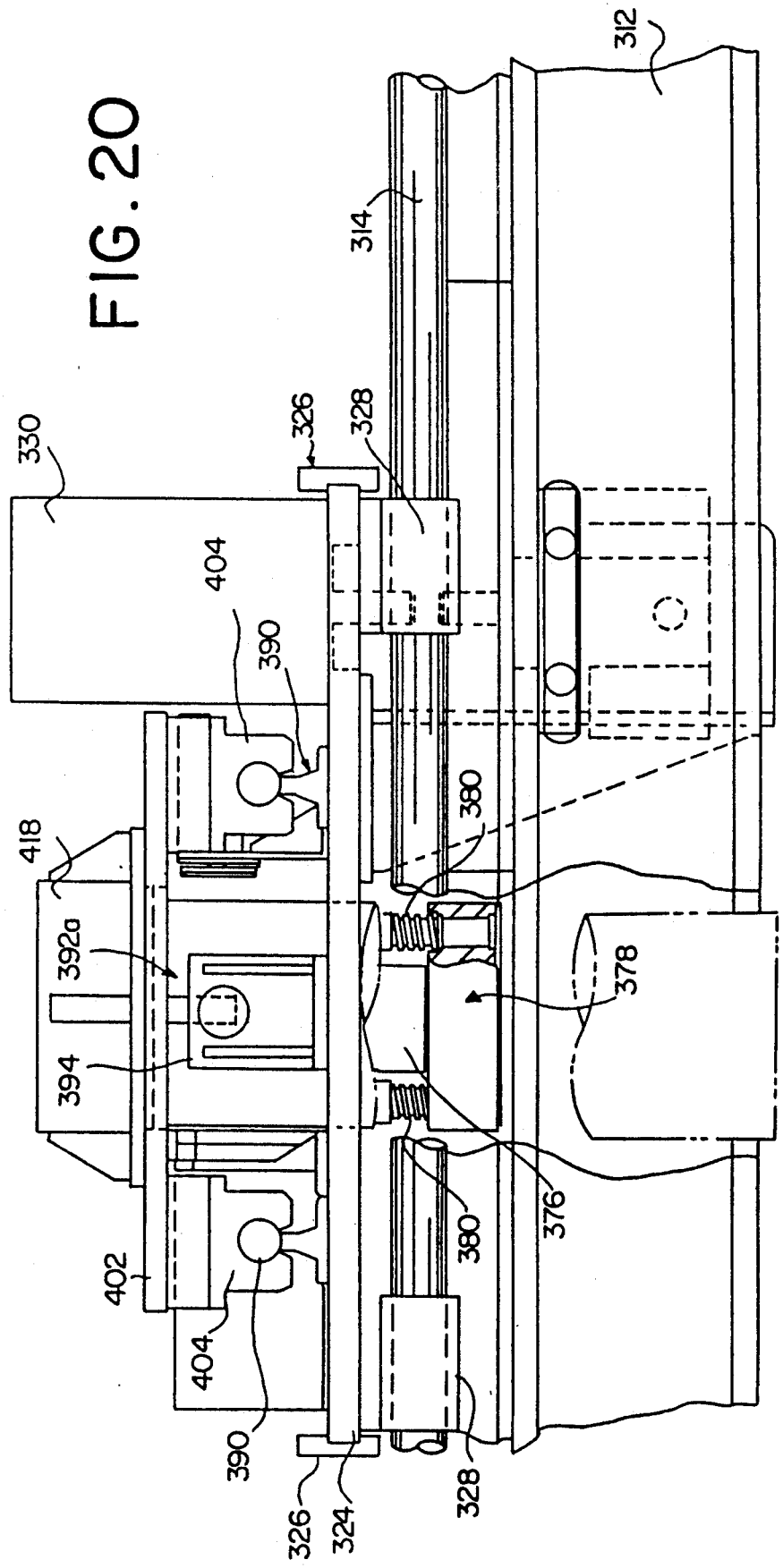
FIG. 20 is a left side view, partially broken away, of the carriage of FIG. 14, including the X direction braking mechanism.
Figure 21:
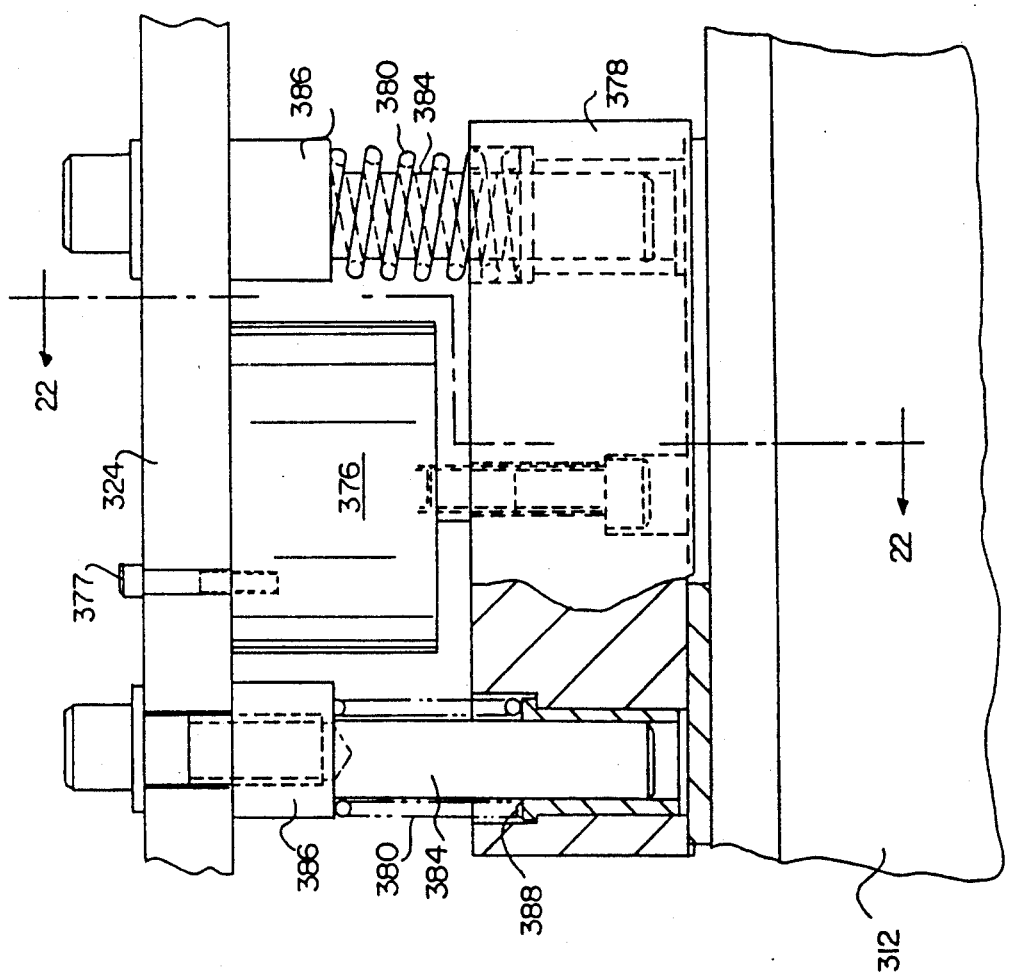
FIG. 21 is an enlarged view of the braking mechanism of FIG. 20.
Figure 22:
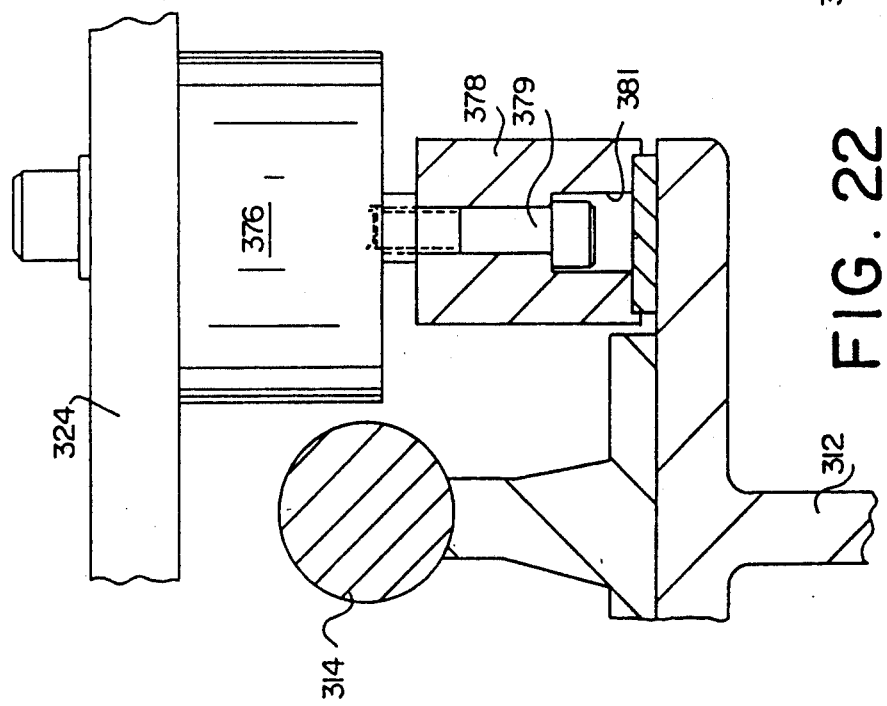
FIG. 22 is a cross section taken substantially along the line 22—22 of FIG. 21.
Figure 23:
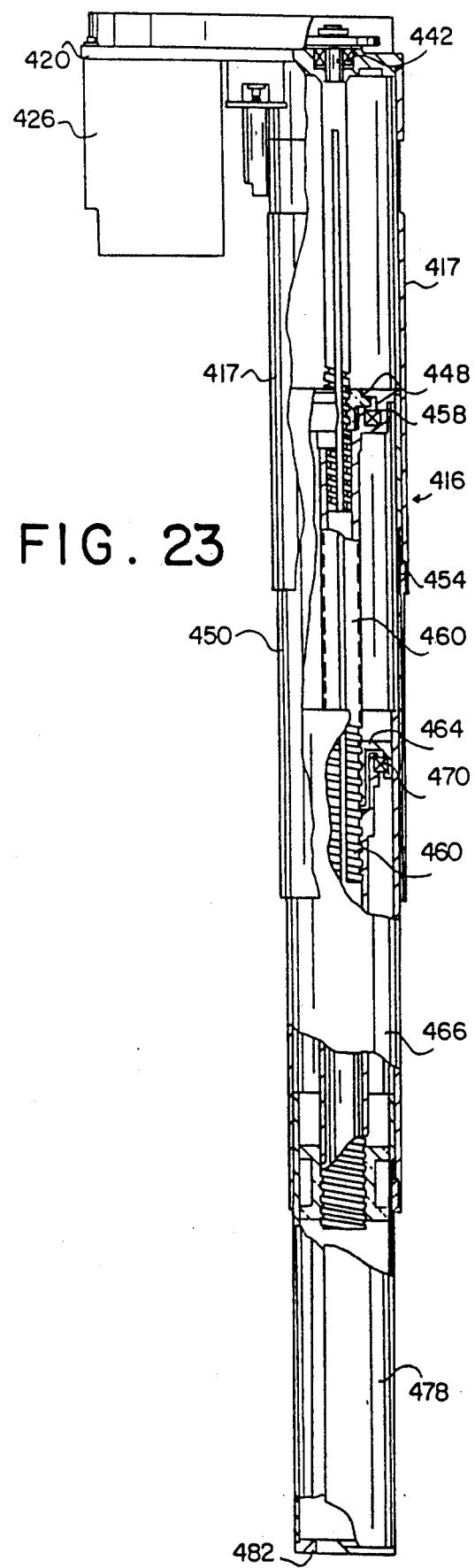
FIG. 23 is an elevational view, partially broken away, of the Z-axis extender of the invention.

Secured to the under surface of the base plate 324 of the transverse track assembly are two braking units 374, one positioned over the upper flange of each of the I beams 312 in the respective track assemblies 306a, 306b. As shown in FIGS. 20-22, each includes an air-operated pneumatic cylinder 376 suspended from the base plate 324, as by bolts 377. The cylinder 376 is supplied with air through a three-way solenoid valve (not shown). Its actuator is connected to a brake block 378 by a bolt 379 whose head is positioned in a recess 381 in the brake block. It normally maintains the brake block 378 raised against the force of a pair of coiled compression springs 380. Each of the compression springs 380 is positioned over a guide rod 384 and extends between a boss 386 secured to the underside of the base plate 324 and a recessed shoulder 388 in the brake block 378.

The bottom of the brake block 378 carries a brake pad 382. In the event of either electrical or air failure, the cylinder 376 releases the brake block which is then pressed against the I beam's upper surface by the springs 380 to stop any movement along the X direction.

Mounted on the upper surface of the base plate 324 of the transverse track assembly 308 are a pair of spaced, parallel rails 390 which are perpendicular to the rails 314 in track assemblies 306a,b. They provide for movement in the Y direction. The rails themselves are circular in cross section and are identical to the X direction rails 314. They extend for substantially the full length of the base plate 324. Mounted on the base plate 324, at each of its ends and intermediate the rails 390 is a shock absorber assembly 392a, 392b. Each shock absorber assembly includes a mounting bracket 394 secured to the base plate 324 and supporting a housing 396, an impact pad 398, and a shock absorbing compression spring 400.

The Y direction carriage 310 comprises a chassis plate 402 which is substantially rectangular and carries on its lower surface two pairs of linear ball bushings 404. These bushings are similar to the bushings 328 which engage the X direction rails 314 and engage the Y direction rails 390 in a similar fashion for movement therealong. Also mounted to the underside of chassis plate 402 is a pair of stop blocks 406a, 406b which are positioned, respectively, to engage the shock absorber assemblies 392a, 392b.

Figure 14:
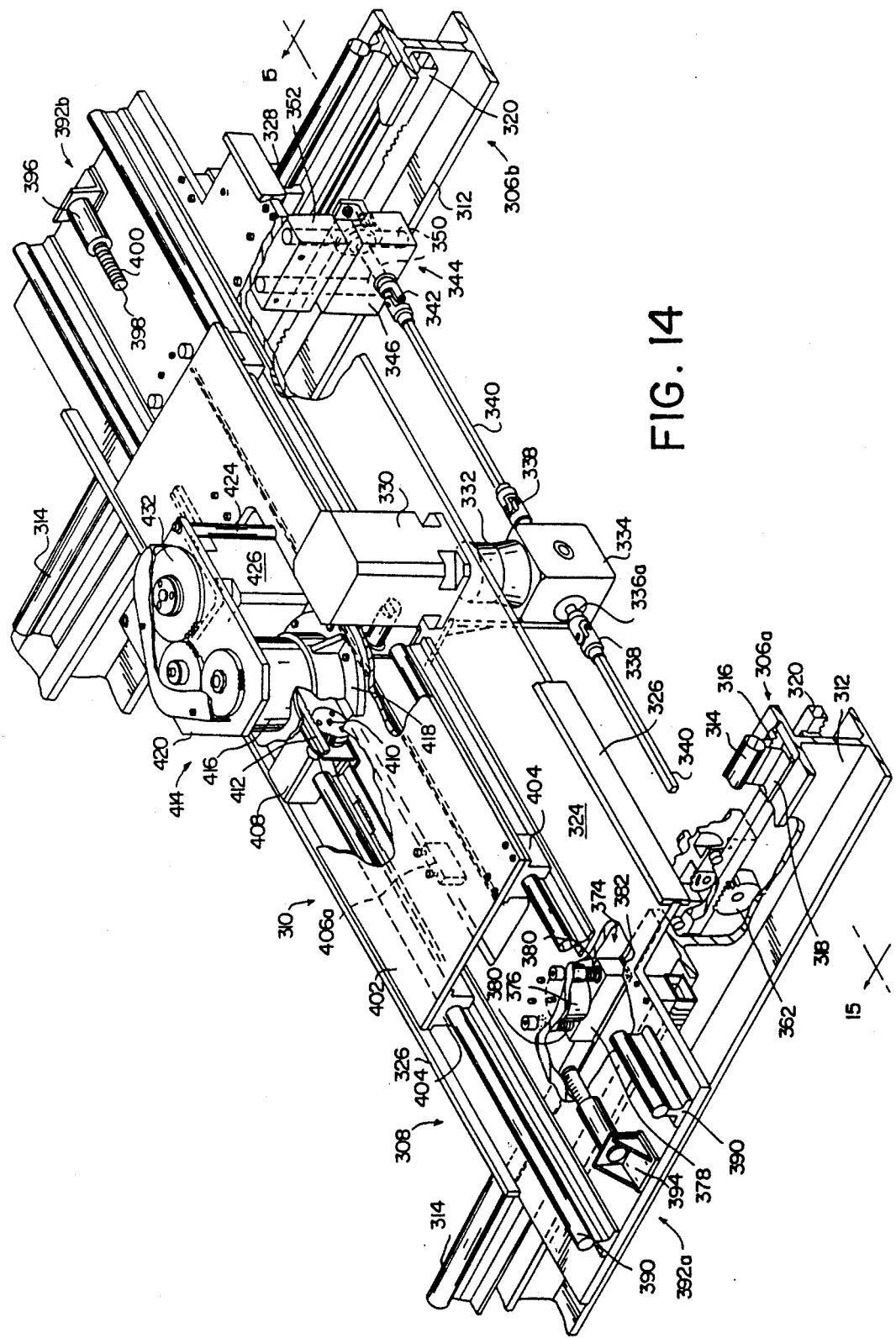
FIG. 14 is a perspective view, partially broken away, of the carriage portion of the gantry of FIG. 13.
Figure 15:
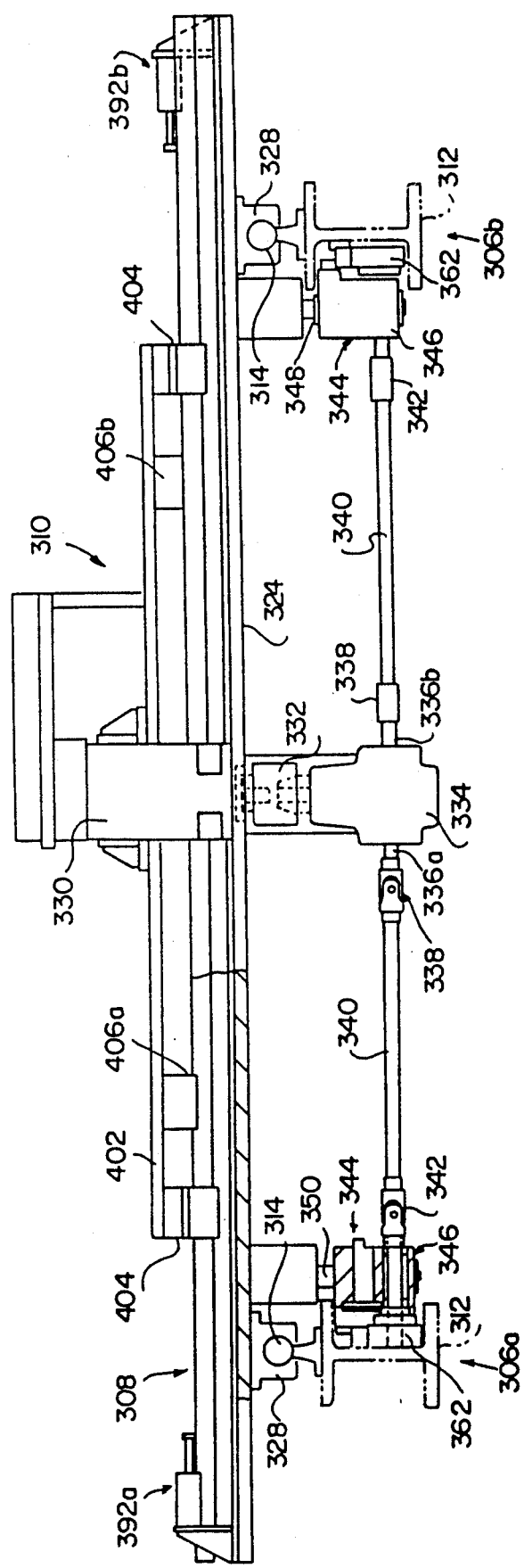
FIG. 15 is a front view of the carriage, taken substantially along the line 15—15 of FIG. 14.

Propulsion of the Y direction carriage 310 is achieved by a Y drive motor 408 which can best be seen in FIG. 14. It is horizontally mounted to drive a pinion 410 which engages rack gear 412 secured to the bottom of chassis plate 402.

Z Drive Assembly

Figure 24:
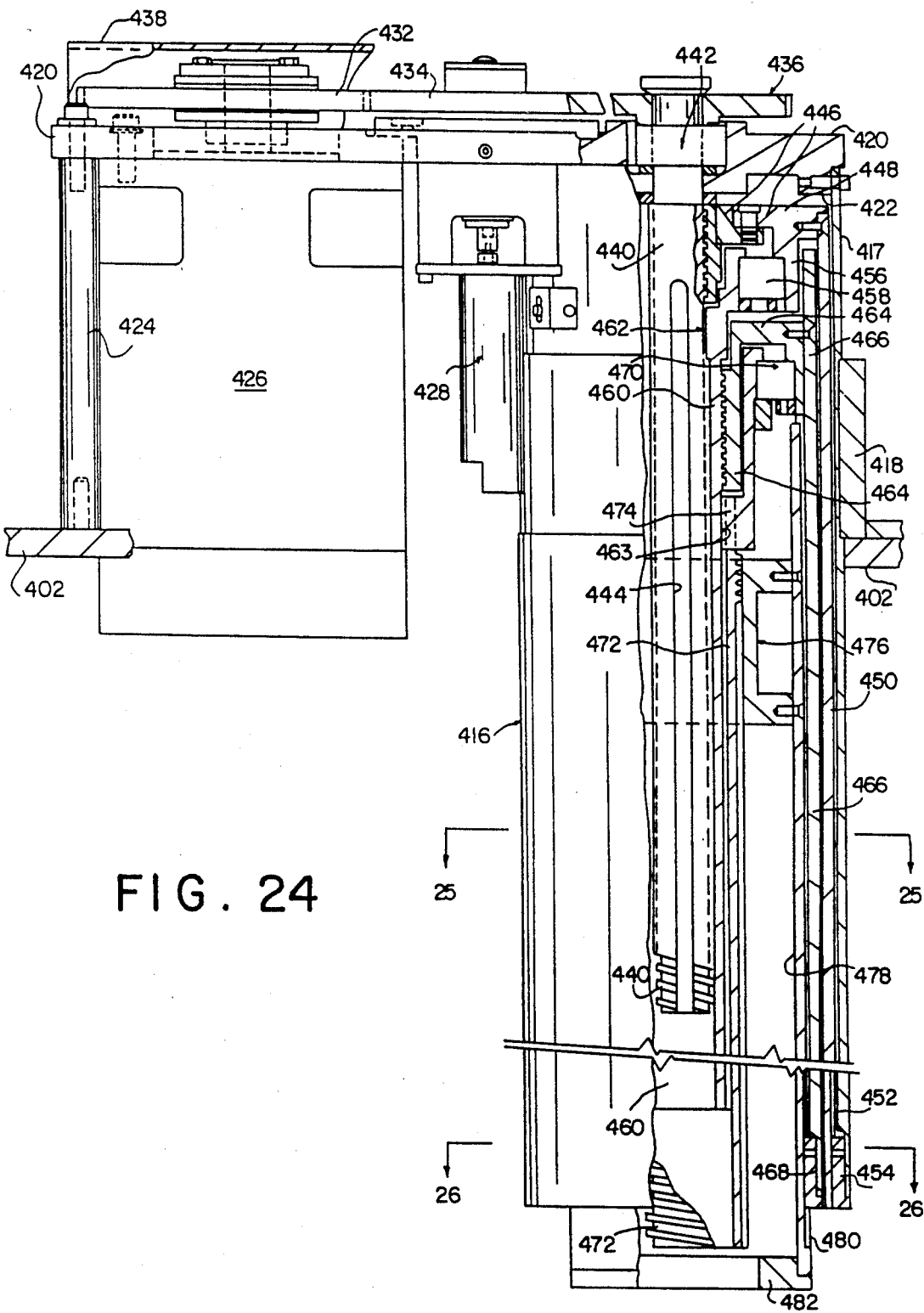
FIG. 24 is an enlarged detail of the extender of FIG. 23 in partial cross section.
Figure 25:
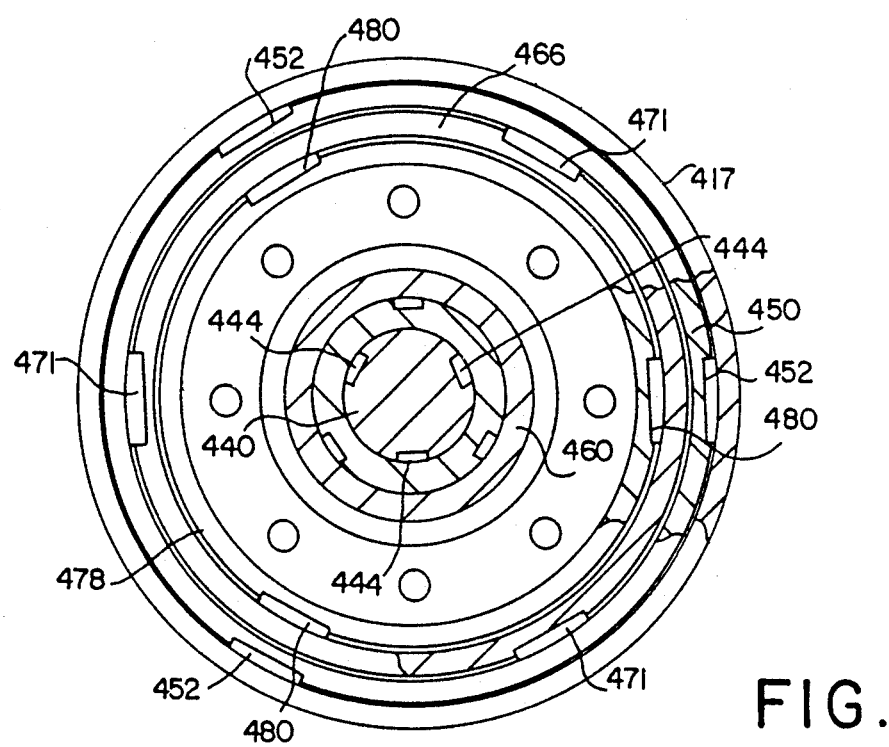
FIG. 25 is an enlarged cross section taken substantially along the line 25—25 of the extender of FIG. 24.
Figure 26:
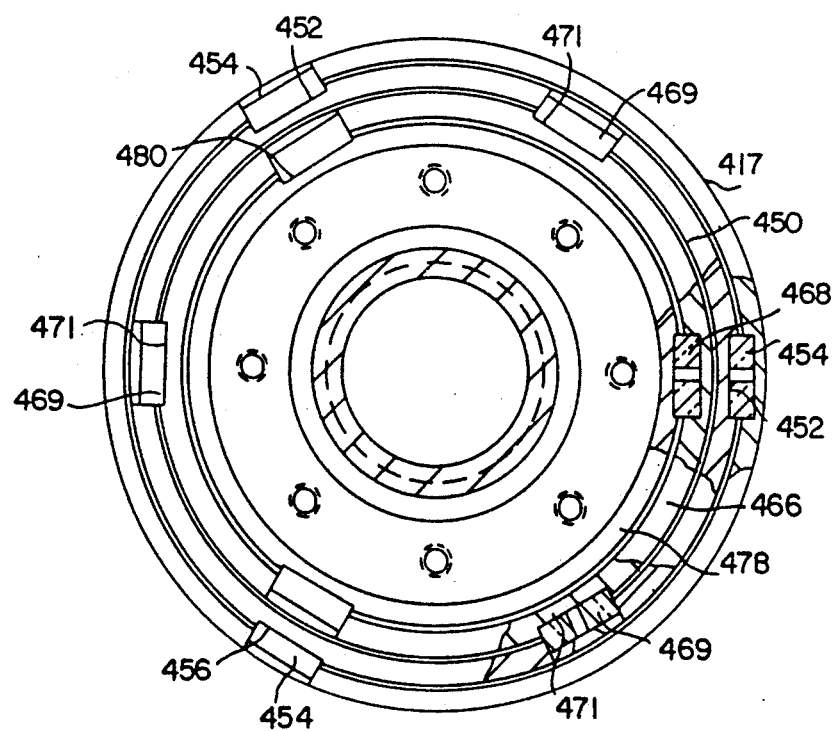
FIG. 26 is an enlarged cross section taken substantially along the line 26—26 of the extender of FIG. 24.

Manipulation of the pickup head 10 in the vertical direction is the function of the Z drive assembly 414. It comprises a substantially cylindrical, telescoping, Z system extender 416 including a stationary top cylinder 417 which is mounted to the top of the chassis plate 402 by means of a clamp 418, the telescoping portion of the extender extending downwardly through a suitable opening in the chassis plate 402 (FIG. 24). An elongated gear train support plate 420 carries a depending circular lip 422 at one end which serves to close the upper end of the stationary cylinder. The support plate extends outwardly from the stationary cylinder 417 parallel to the chassis plate 402 and its remote end is supported by a pair of posts 424 which extend upwardly from the chassis plate 402. Secured to, and depending from, the support plate 420 is a d.c. servomotor 426 which is similar to the X drive motor 330. Also secured to, and depending from, the support plate 420 is a resolver 428.

Figure 18:
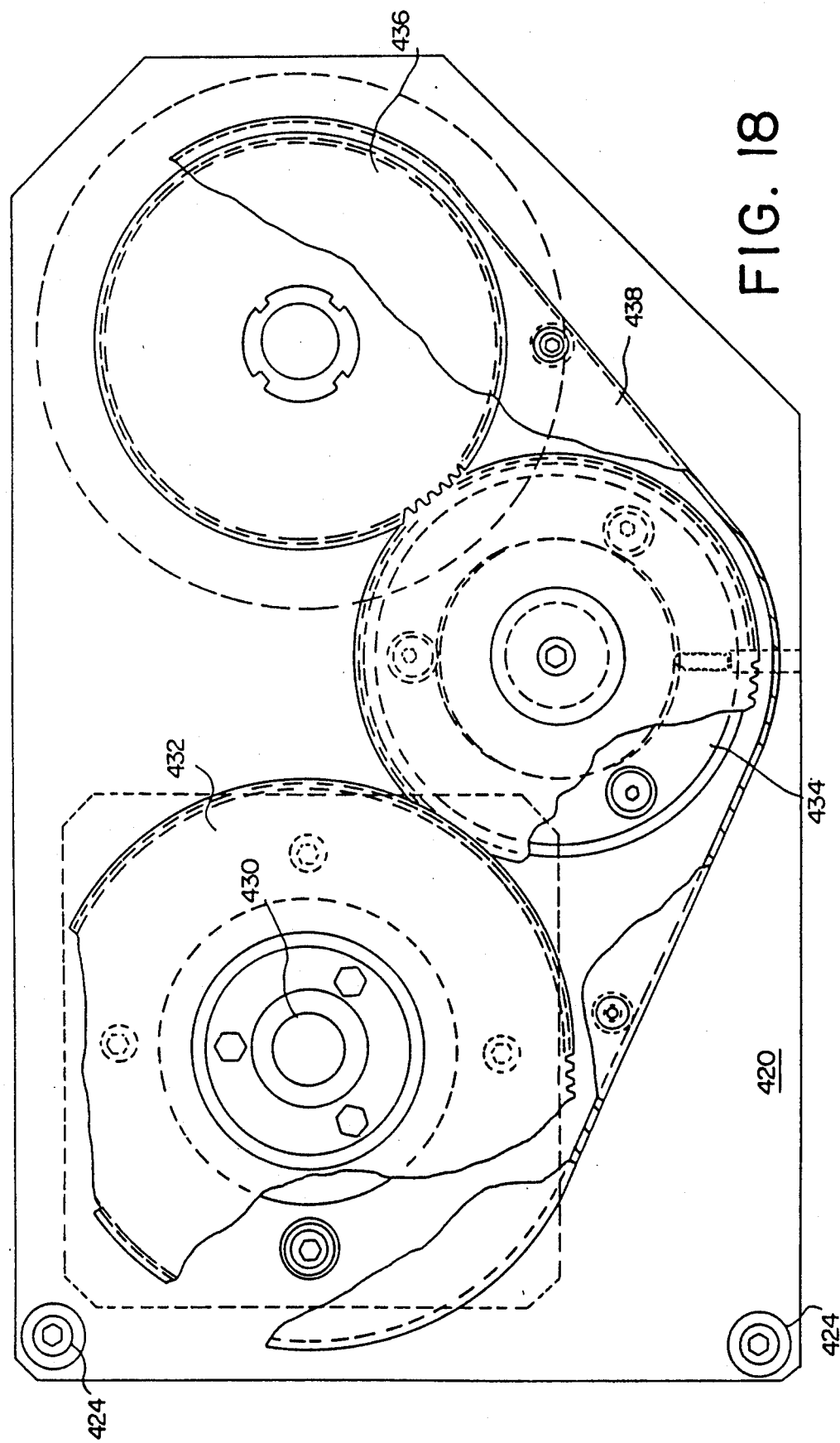
FIG. 18 is a top view, partially broken away, of a portion of the Z-drive mechanism of the carriage of FIG. 14.
Figure 19:
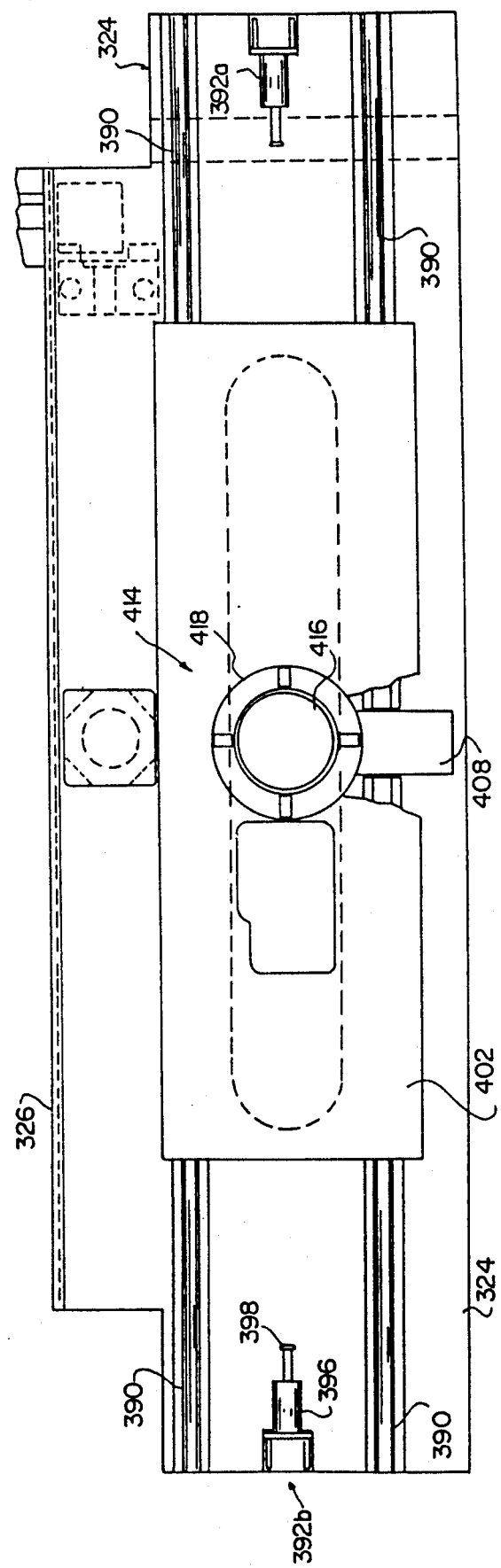
FIG. 19 is a top view of the carriage of FIG. 14.

With particular reference to FIGS. 14, 18, and 24, it will be noted that the shaft 430 of motor 426 extends through the gear train support plate 420 and is connected to a main drive gear 432. The main drive gear meshes with and drives an intermediate gear 434 which drives the resolver 428. Driven by the intermediate gear 434 is the drive gear 436 of the Z extender. The gear train so formed is enclosed by a gear train housing 438.

Z Extender

The operation of the Z extender system 416 will be best understood by reference to FIGS. 23-26. As previously explained, the upper, stationary, cylinder 417 is secured to the chassis plate 402 by the clamp 418. A primary lead screw 440 extends axially downwardly through a bearing 442 into the stationary cylinder 417 and is driven from its upper end by the extender drive gear 436. The thread of the primary lead screw 440 is interrupted throughout most of its length by three longitudinal slots 444. Threadedly engaging the primary lead screw 440 is a screw follower nut 446 to which is secured a circular header 448 which supports the upper end of a cylindrical primary sleeve 450. Along the outside of the primary sleeve 450 and extending from its lower end for approximately three quarters of its length are three equally spaced vertical keyways 452. The lower end of the stationary cylinder 417 carries three key members 454, each of which engages one of the keyways 452.

Extending downwardly from the circular header 448 is an annular bearing support member 456 which carries the outer race of a thrust bearing 458. The inner race of the thrust bearing 458 carries the upper end of a secondary lead screw 460 which surrounds the primary lead screw 440 and has three internally projecting keys 462 which fit slidably within the slots 444 of the primary lead screw. The thread of the secondary lead screw is interrupted by three slots 463 similar to the slots 444 in the primary lead screw 440.

A cup-shaped secondary screw follower nut 464 threadedly engages the secondary screw and carries a secondary sleeve 466 which nests within the primary sleeve 450. Key members 469 mounted on the inner surface of primary sleeve 450 engage keyways 471 in the outer surface of the secondary sleeve 466. The lower end of secondary sleeve 466 carries on its inner surface three spaced key members 468 similar to the key members 454 carried by the stationary cylinder 417. Also carried by the secondary screw follower nut 464 is the outer race of a thrust bearing 470. The inner race of the thrust bearing 470 carries a tertiary lead screw 472 which surrounds the secondary lead screw 460. The upper end of the tertiary lead screw includes three inwardly projecting keys 474 which engage the slots 463 in the secondary lead screw.

Engaging the threads of the tertiary lead screw 472 is a tertiary lead screw follower nut 476. Secured at its upper end to the follower nut 476 is a tertiary sleeve 478. The outer surface of the tertiary sleeve 478 defines longitudinal keyways 480 which receive the key members 468 carried by the lower end of secondary sleeve 466. The lower end of the tertiary sleeve is provided with a stiffening ring 482.

Figure 27:
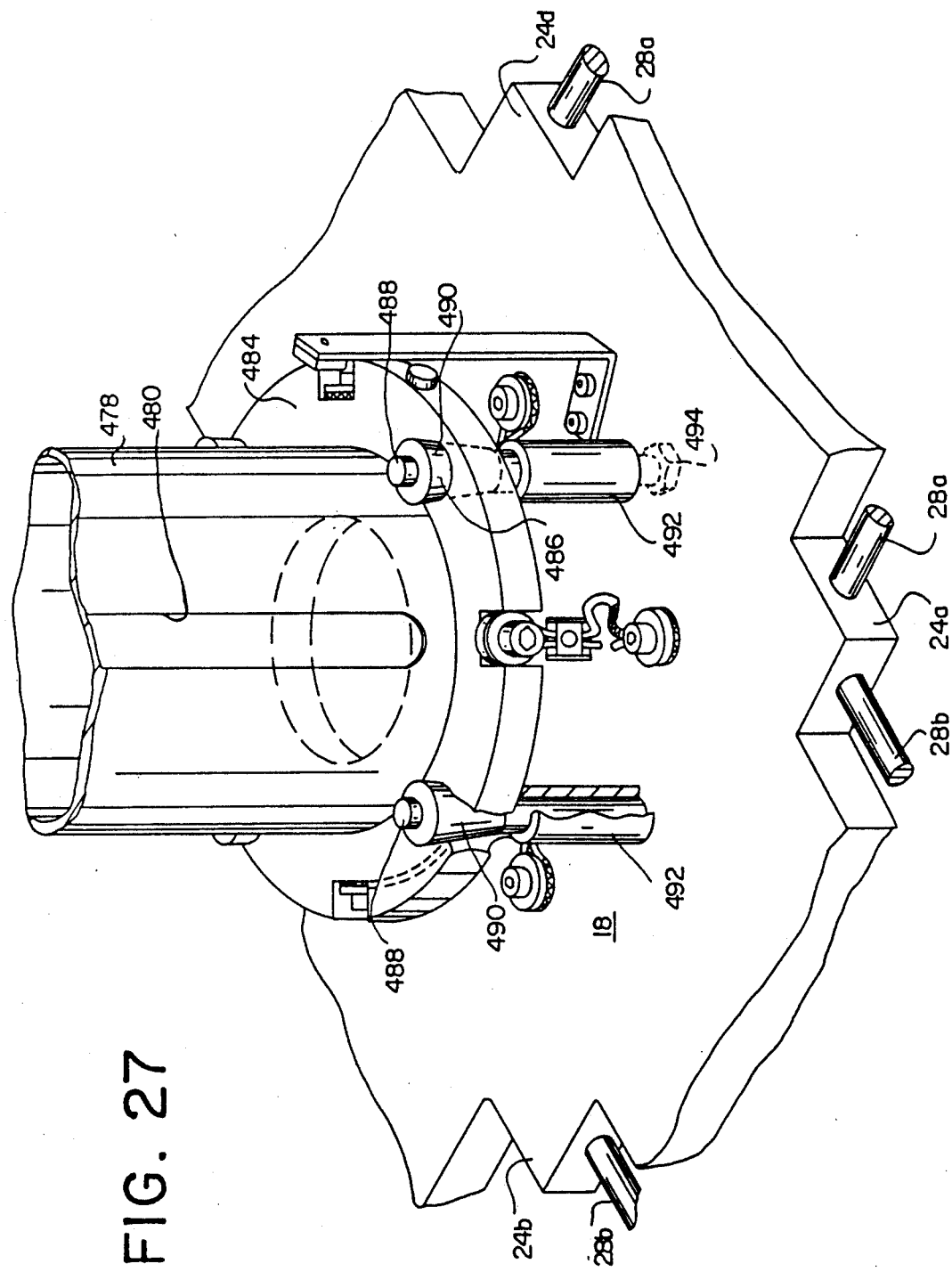
FIG. 27 is a perspective view showing the manner in which the extender of FIGS. 23—26 attaches to the top of the pickup head.

FIG. 27 illustrates the manner in which the tertiary sleeve 478 of the Z extender is connected to the top plate 18 of the pickup head 10. A flange 484 is secured to the lower end of the tertiary sleeve 478. The flange includes a series of spaced conical holes 486. Positioned within each of the holes 486 is a bolt 488 having a conical head 490 which matches the taper of its associated hole 486. A cylindrical sleeve 492 fits loosely over the shank of each bolt 488. The bolts extend through the top plate 18 and a nut 494 is threaded on the end of each. The lengths of the sleeves 492 are such that, when the pickup head is hanging from the sleeve 478, there is clearance between the top of each sleeve and the flange 484. When the pickup head 10 is lowered onto a receiving surface, the flange is free to slide downwardly off the tapered heads 490.

Operation

Figure 2:
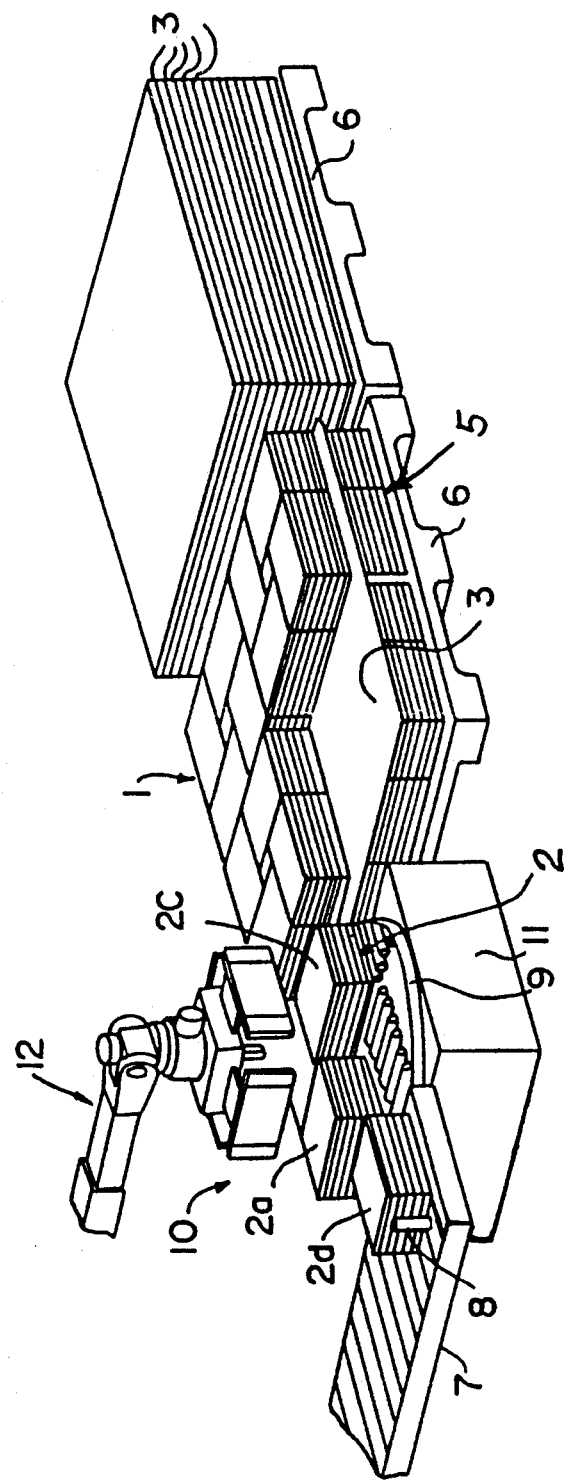
FIG. 2 is a perspective view showing the apparatus involved in accomplishing the evolution shown in FIG. 1.

Assume that it is desired to move the "cube" 1 of stacked material shown in FIGS. 1-3 from the turntable 9 to a newly forming tier 5. Assume further that the pickup head 10 of this invention is connected to the gantry 300. The pickup head is moved in the X direction by running the X drive motor 330 in the proper direction. The rotation of the vertical shaft of the motor is transmitted through the right angle gear box 334 to the drive shafts 340. The drive shafts operate the pinions associated with each of the track assemblies 306a, 306b, causing them to advance along their respective racks 320, thereby propelling the entire transverse track assembly 308 along the rails 314 to the desired location.

Simultaneously, the pickup head is maneuvered in the Y direction by the operation of the Y drive motor 408. This motor drives the pinion 410 which advances along the rack 412, carrying with it the carriage 310 which moves along the rails 390. The pickup head 10 is thus moved into position above and aligned with the cube 1.

The pickup head 10 may then be expanded to receive the cube to be moved by actuating the side panel drive motor 180. This motor drives the pinion gear 178 which in turn rotates the large gear 176 positioned below the top plate 18. Rotation of this gear translates the inner ends of the connecting rods 182 toward their respective side panels 32. The side panels 32 are restrained against rotational motion but are extended outwardly by virtue of the bearing blocks 30 moving along the guide rods 28. At this time none of the outer fingers 44, 48 or inner fingers 150 have been actuated and, accordingly, they are all hanging vertically.

With the side walls 32 thus extended, the pickup head 10 is lowered over the cube 1 and downward into engagement with the separator 3, thereby enveloping the cube 1. The inner member comprising sleeve 128 and fingers 150 passes downwardly through the opening 4 in the cube 1. In one actual embodiment of this invention, the side panels 32 are approximately one inch from the sides of the cube when the depending fingers first contact the separator 3.

Vertical movement of the pickup head 10 is achieved with the Z extender shown in FIG. 24. The Z drive servomotor 426 drives the gear train to rotate the primary lead screw 440. As the primary lead screw rotates, it causes the header 448 to travel downward. (This explanation begins with the extender in the raised position illustrated in FIG. 24. Obviously, the operation is reversible to raise the extender.) As the header 448 travels downward, it carries with it the primary sleeve 450. Rotation of the header and primary sleeve is prevented by the key members 454 on the stationary cylinder 417 riding within the keyways 452 of the primary sleeve.

Acting through the thrust bearing 458, the header 448 also carries with it the secondary lead screw 460. The secondary lead screw is keyed to the primary lead screw 440 by virtue of the keys 462 on the inside of the secondary lead screw being positioned within the vertical slots 444 on the primary lead screw. Therefore, as the secondary lead screw 460 moves downward, it also rotates.

Rotation of the secondary lead screw 460 also drives downward the secondary screw follower nut 464. This nut carries with it the secondary sleeve 466. Both the nut and the sleeve are prevented from rotating by virtue of the key members 469 (FIG. 26) on the bottom of the primary sleeve 450 riding in the keyways 471 on the secondary sleeve 466.

Also carried downward by the secondary screw follower nut 464 through the thrust bearing 470 is the tertiary lead screw 472. The tertiary lead screw is caused to rotate with the secondary lead screw by the keys 474 on the former riding in the slots 463 on the latter. The rotating tertiary lead screw drives the tertiary follower nut 476 downward, carrying with it the tertiary sleeve 478 to which the pickup head 10 is connected. The tertiary sleeve is restrained from rotation by key members 468 on the bottom of the secondary sleeve 466 which are confined within the keyways 480 on the outside of the tertiary sleeve 478.

Prior to engaging the separator 3 the outer fingers 44, 48 are in the position illustrated in FIG. 9. The separator 3 may be made of a material such as plywood, fiberboard, or plastic having a relatively hard smooth surface. As the finger begins to engage this surface it is rotated from the position illustrated in FIG. 9 toward that illustrated in FIG. 8. As it thereby rotates it forces the insertion leaf 116 ahead of it so that the thin insertion leaf slips between the separator 3 and the lowermost item in the stack 2. This initial entry of each of the leaves 116 is followed by the sturdier fingers 44, 48. Meanwhile, the fingers 150 of the center elements have similarly engaged separator 3 and are cammed into the horizontal position illustrated in FIG. 7. Thus, as illustrated in FIG. 7, all fingers, both exterior and interior, have been forced into position beneath the edges of the cube. However, they have not been locked.

Locking is achieved by actuating the up-down drive motor unit 160 to rotate the shaft 162 and advance the crank lever 166 clockwise as viewed in FIG. 4. This achieves several objectives. By rotating drive rod 52c approximately 20° it forces down the end of crank arm 156c. As the pin 158 in the end of the crank arm 156c is positioned within the groove 134 of spindle 132, this movement also forces the spindle downward. The spindle carries with it the pins of the other three crank arms 156a, b, d so that all four of drive rods 52a–d rotate by equal amounts. As spindle 132 moves downward it carries with it the reciprocating shaft 130 (FIG. 7) and spring 146, thereby causing locking element 140 to engage the inner ends of, and lock, the inner fingers 150, thus securing the cube 1 from its center.

The outer fingers are locked by reason of the drive blocks 60 being rotated downwardly 20° by their respective drive rods 52. The downward rotation is transmitted through the cam wheel 64 and the guide rods 70 (FIG. 5) to the cross bar 78. The lowering of cross bar 78 also lowers the depending locking plungers 80.

These plungers are forced downwardly, causing the rollers 86 (FIG. 10) to engage the locking surfaces 110 of the locking legs 108 of the fingers 44, 48 thereby preventing them from dropping out of position.

The side panel drive motor 180 is next operated to step the gear 176 back to its original position. This causes all the connecting rods 182 to retract, thereby pulling the side panels 32 back into close engagement with the sides of the cube 1. The action of the spring 202 (FIG. 12) in the connecting rod assembly causes continuous pressure to be applied against the cube sides. With both the inner and outer lifting fingers locked into position the pickup head 10 may now be lifted and transported to a new location and lowered onto a receiving platform. The sequence of actions is then reversed, thereby retracting the locking elements and releasing the lifting fingers. The side panels are extended and the pickup head 10 is lifted off the cube 1.

If the cube 1 should happen to be made of square stacks 2 there would be no central opening 4. The pickup head of this invention, however, is fully capable of lifting and carrying a cube using only the outer fingers 44, 48. In this event, the central assembly can be easily removed by hand. It is simply rotated 45°, such that the reliefs 136 (FIG. 6) are aligned with the pins 158 carried by the respective crank arms 156 and the opposed pins 126 are in the vertical portions of the bayonet slots 127. The entire central assembly may then simply be withdrawn.

Another feature of this invention permits the ready removal of the separators 3. As the cross bars 78 in the side panels are lowered, the vacuum cups 90 are lowered into engagement with the separator 3. Vacuum may then be applied to the vacuum cups 90 through the tubing 94, thereby engaging the separator 3 for subsequent movement.

As used in the following claims, the term "cube" does not have its customary geometrical meaning. It is to be interpreted, rather, as having the meaning given in the foregoing description.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. A pickup head adapted to be raised, lowered, and moved by a transporter into various locations which are horizontally spaced one from another for grasping, lifting, and transporting a cube of four stacks of similar height of printed products each of which has been folded to form a spine extending along one margin and wherein the four stacks in the cube are arranged in abutting relationship to form the cube having a substantially square perimeter as seen in top plan view with each of the four stacks in the cube being oriented for positioning spines of printed products therein in a respective direction at 90° relative to spines of printed products in the respective two adjoining stacks, said pickup head comprising:

a top member engageable by said transporter;

at least four guide members carried by said top member and extending horizontally in mutually perpendicular directions;

four vertically depending side panels, each supported respectively by a different one of said guide members and horizontally movable therealong between an extended, release position and a retracted, grasping position for collectively confining a four-sided volume of variable dimensions;

means for moving each of said side panels between its extended and retracted positions;

at least one finger pivotally mounted to a bottom portion of each panel for pivotal movement about a horizontal pivot axis;

said finger being pivotable between a lowered position and a raised position;

said finger having an extremity spaced from said pivot axis for insertion beneath a cube;

during downward movement of the pickup head toward carrying means for the cube, said extremity of the finger coming into contact with said carrying means and said extremity of the finger being cammed from said lowered position into said raised also is being cammed from said lowered position into said raised position by contact of the finger with said carrying means for the cube during downward movement of the pickup head; and releasable locking means for locking said finger in its raised position beneath the cube in supporting position beneath the cube for enabling the cube to be picked up by upward movement of the pickup head.

2. The pickup head of claim 1, wherein the means for moving the side panels comprise:

a connecting rod associated with a respective side panel, each connecting rod having first and second ends, said first end of each connecting rod being secured to said respective side panel;

means connected to the second end of each connecting rod for pushing and pulling said rod to extend and retract its associated side panel; and means associated with each connecting rod for providing continuous pressure of the four side panels against respective sides of the cube.

3. A pickup head adapted to be raised, lowered, and moved into horizontally displaced locations by a transporter for grasping, lifting, and transporting a substantially rectangular stack of sheet material which comprises:

a top member engageable by said transporter;

at least four guides carried by said top member and extending horizontally in mutually perpendicular directions;

four vertically depending side panels, each supported respectively by a respective one of said guides and horizontally movable therealong between an extended, release position and a retracted, grasping position for collectively confining a rectangular volume of variable dimensions;

means for moving each of said side panels between its extended and retracted positions;

supporting means carried at the bottom of each of said side panels for extending beneath, and supporting, a stack of material to be lifted;

means for locking the respective supporting means of each of said side panels into supporting position and releasing the supporting means; and a plurality of vacuum cups mounted at the bottom of each of said side panels for engaging and lifting a stack separator sheet.

4. A pickup head adapted to be raised, lowered, and moved into horizontally displaced locations by a transporter for grasping, lifting, and transporting a substantially rectangular stack of sheet material which comprises:

a top member engageable by said transporter;

at least four guides carried by said top member and extending horizontally in mutually perpendicular directions;

four vertically depending side panels, each supported respectively by a respective one of said guides and horizontally movable therealong between an extended, release position and a retracted, grasping position for collectively confining a rectangular volume of variable dimensions;

means for moving each of said side panels between its extended and retracted positions;

means carried at the bottom of each of said side panels for extending beneath, and supporting, a stack of material to be lifted;

means for locking the respective supporting mean of each of said side panels into supporting position and releasing the supporting means;

said means for moving the side panels comprising a connecting rod having first and second ends associated with a respective side panel, said first end of each connecting rod being pivotally secured to said respective side panels;

means connected to the second end of each connecting rod for pushing and pulling said rod to extend and retract its associated side panel; and said pushing and pulling means comprising an actuating member rotatable about a vertical axis substantially equidistant from said side panels and eccentrically connected to the second end of each of said connecting rods.

5. The pickup head of claim 4 wherein said actuating member comprises a wheel rotatable between a first and a second position.

6. The pickup head of claim 5 wherein said wheel is a gear.

7. A pickup head adapted to be raised, lowered and moved into horizontally displaced locations by a transporter for grasping, lifting, and transporting a substantially rectangular stack of sheet material which comprises:

an upper member engageable by said transporter;

at least four guides carried by said upper member and extending horizontally in mutually perpendicular directions;

four vertically depending side panels, each supported respectively by a respective one of said guides and horizontally movable therealong between an extended, release position and a retracted, grasping position for collectively confining a rectangular volume of variable dimensions;

means for moving each of said side panels between its extended and retracted positions;

mean carried at the bottom of each of said side panels for extending beneath, and supporting, a stack of material to be lifted;

means for locking the respective supporting means of each of said side panels into supporting position and releasing the supporting means;

said means for moving the side panels comprising:

a connecting rod having first and second ends associated with a respective side panel, said first end of each connecting rod being pivotally secured to said respective side panels;

means connected to the second end of each connecting rod for pushing and pulling said rod to extend and retract its associated side panel; and each of said connecting rods include resilient coupling means for interconnecting its first and second ends.

8. A pickup head adapted to be raised, lowered, and moved to various horizontally displaced locations by a transporter for grasping, lifting, and transporting a substantially rectangular stack of sheet material which comprises:

an upper member engageable by said transporter;

at least four guides carried by said upper member and extending horizontally in mutually perpendicular directions;

four vertically depending side panels, each supported respectively by a respective one of said guide and horizontally movable there along between an extended, release position and a retracted, grasping position for collectively confining a rectangular volume of variable dimensions;

means for moving each of said side panels between its extended and retracted positions;

supporting means carried at the bottom of each of said side panels for extending beneath, and supporting, a stack of material to be lifted;

means for locking the respective supporting means of each of said side panels in supporting position and for releasing the supporting means; and said supporting means comprising a finger pivotally secured to the bottom of each of said side panels in a manner whereby, upon the pickup head being lowered over said stack, the finger engages a surface supporting said stack and is cammed by said surface into a supporting position for entering beneath said stack.

9. The pickup head of claim 8 wherein said supporting means includes a thin insertion leaf rotatably hanging from the bottom of said side panel and positioned to be cammed by said finger beneath said stack in advance of said finger.

10. The pickup head of claim 8 wherein said finger is substantially L-shaped and includes a support surface which is substantially horizontal when in the supporting position and a locking leg extending substantially vertically therefrom when in the supporting position.

11. The pickup head of claim 10 wherein said locking means comprises a plunger vertically movable relative to said finger from a release position free of said locking leg to a locking position engaging said locking leg and holding it from rotating under the weight of said stack.

12. The pickup head of claim 11 wherein said side panel is substantially hollow and said plunger extends vertically therethrough and out the top of said side panel and wherein means for actuating said plunger are positioned on said upper member.

13. The pickup head of claim 12 wherein the plunger actuating means for each side panel comprises:

a substantially horizontal drive rod extending from said side panel to a central region of said upper member substantially equidistant from said side panels, said drive rod being mounted for rotation about its longitudinal axis between a first and a second position;

means mounted on said drive rod for rotation therewith to lift and lower said plunger between its release and locking positions; and means for rotating said drive rod between its first and second positions.

14. The pickup head of claim 13 wherein said drive rod rotating means comprises:

a crank lever connected to one of said drive rods;

means for driving said crank lever through a preselected arc; and means responsive to the rotation of said one drive rod for rotating the other of said drive rods by substantially similar amounts.

15. The pickup head of claim 14 wherein said rotation responsive means comprises:

a vertically movable spindle positioned in said central region having defined thereon a substantially horizontal, circular, circumferential groove;

a crank arm carried by each of said drive rods; and a pin carried by each of said crank arms, said pin being positioned in the circumferential groove of said spindle whereby the vertical movement component of the rotation of the crank arm of said one drive rod is transmitted to the other of said crank arms through the vertical movement of said spindle.

16. The pickup head of claim 15 wherein a central support post assembly is secured to, and extends downwardly from, said upper member, said assembly including means at its lower end for supporting said stack from a centrally located opening therein.

17. The pickup head of claim 16 wherein said support post assembly comprises:

an outer sleeve releasably secured to said top plate; and a shaft within said outer sleeve, secured to said spindle, and reciprocable therewith within said outer sleeve.

18. The pickup head of claim 17 wherein said stack supporting means comprise:

a plurality of support fingers pivotably mounted to the bottom of said outer sleeve for rotation between a vertical, release, position and a horizontal, support, position; and locking means on said reciprocable shaft for engaging and locking said support fingers in their support positions when said spindle and shaft are in their lowermost position.

19. The pickup head of claim 16 wherein:

the pins in the circumferential groove of said spindle are positioned at substantially 90° intervals thereabout during normal operation; and said spindle has defined thereon a vertical relief substantially intermediate each pair of pins, each relief being of a size to permit a pin to pass vertically therethrough, whereby said support post assembly is removable from said upper member by rotating it to align said pins with said vertical reliefs.

20. The pickup head of claim 19 comprising:

bayonet type coupling means for coupling and decoupling said post assembly to said upper member upon rotation between the operating position of said pins and the position at which said pins are aligned with said reliefs.

21. A pickup head adapted to be raised, lowered and moved by a transporter into various horizontally displaced locations for grasping, lifting and transporting a cube formed by four stacks of printed products each of which has been folded to form a spine extending along one margin and wherein the four stacks are of similar height and are abutting one another in the cube which has a substantially square perimeter as seen in top plan view and wherein each of the four stacks is positioned with spines of printed products therein oriented in a respective direction at 90° relative to spines of printed products in two respective adjoining stacks, said pickup head comprising:

mounting means engageable by said transporter;

four vertically depending side panels carried by said mounting means;

said four side panels being arranged in tow pairs, with each pair including two opposed parallel side panels;

the two opposed parallel side panels in one pair being oriented perpendicular to the two opposed side panels in the other pair;

the two opposed parallel side panels in each pair being movable toward and away from each other for collectively confining a four-sided volume of variable dimensions;

means for moving the two opposed parallel side panels of each pair toward and away from each other;

at least one finger pivotally mounted to a lower portion of at least two opposed side panels;

each of said fingers being mounted for pivotal movement about a respective horizontal pivot axis;

each of said fingers being pivotable between a lowered position and a raised position;

each of said fingers having an end spaced from its respective pivot axis;

each such end of a finger being adapted to be inserted beneath a cube resting upon support means;

during downward movement of the pickup head toward support means upon which a cube is being supported, said ends of each of said fingers touching upon the support means and thereby becoming pivoted from said lowered position into said raised position while also becoming inserted beneath said cube resting upon the support means; and releasable locking means for locking said finger in its raised position beneath said cube for enabling said cube to be picked up upon upward movement of the pickup head.

22. A pickup head adapted to be raised, lowered an moved by a transporter into various horizontally displaced locations for grasping, lifting and transporting a cube formed by four stacks of printed products each of which has been folded to form a spine extending along one margin and wherein the four stacks are of similar height and are abutting one another in the cube which has a substantially square perimeter as seen in top plan view and wherein each of the four stacks is positioned with spines of printed products therein oriented in a respective direction at 90° relative to spines of printed products in two respective adjoining stacks, said pickup head comprising:

mounting means engageable by said transporter;

four vertically depending side panels carried by said mounting means;

said four side panels being arranged in two pairs, with each pair including two opposed parallel side panels;

the two opposed parallel side panels in one pair being oriented perpendicular to the two opposed side panels in the other pair;

the two opposed parallel side panels in each pair being movable toward and away from each other for collectively confining a four-sided volume of variable dimensions;

means for moving the two opposed parallel side panels of each pair toward and away from each other;

means carried at the bottom of each of said side panels for extending beneath, and supporting, a cube of four stacks of printed products to be lifted, means for holding the respective supporting means of each side panel in supporting position and for retracting the supporting means, and said supporting means comprising at least one finger pivotally secured to the bottom of a respective side panel in a manner whereby, upon the pickup head being lowered over a cube, the finger engages a surface supporting the cube and is cammed by said surface into a supporting position extending inwardly toward the volume confined by said four side panels.

23. A pickup head as claimed in claim 22, in which:

at least one finger has an insertion leaf operatively associated with the finger and movable between a retracted position and an extended position; and said insertion leaf in its extended position being adapted to slip beneath a lower most printed product in a stack in the cube for enabling entry of the finger beneath the lowermost printed product.

24. A pickup head as claimed in claim 23, in which:

said insertion leaf is pivotally secured to a side panel by second pivot means positioned on the side panel at a predetermined location relative to first pivot means pivotally securing the finger to the side panel;

said second pivot means being located higher on the side panel than said first pivot means;

said second pivot means being located closer to the volume confined by said four side panels than said first pivot means; and said insertion leaf touching a surface of said finger facing toward said confined volume;

whereby, upon the finger being cammed into said supporting position, said insertion leaf moves into said extended position.

25. A pickup head adapted to be raised, lowered and moved by a transporter into various horizontally displaced locations for grasping, lifting and transporting a cube formed by four stacks of printed products each of which has been folded to form a spine extending along one margin and wherein the four stacks are of similar height and are abutting one another in the cube which has a substantially square perimeter as seen in top plan view and wherein each of the four stacks is positioned with spines of printed products therein oriented in a respective direction at 90° relative to spines of printed products in two respective adjoining stacks, said pickup head comprising:

mounting means engageable by said transporter;

four vertically depending side panels carried by said mounting means;

said four side panels being arranged in two pairs, with each pair including two opposed parallel side panels;

the two opposed parallel side panels in one pair being oriented perpendicular to the two opposed side panels in the other pair;

the two opposed parallel side panels in each pair being movable toward and away from each other for collectively confining a four-sided volume of variable dimensions;

means for moving the two opposed parallel side panels of each air toward and away from each other;

means carried at the bottom of each of said side panels for extending beneath, and supporting, a cube of four stacks of printed products to be lifted;

means for holding the respective supporting means of each side panel in supporting position and for retracting the supporting means;

each of said four stacks of printed products forming the cube having a rectangular perimeter as seen in top plan view with a central opening extending vertically through the cube, said pickup head further comprising:

a vertically elongated central member carried by said mounting means;

said vertically elongated central member being adapted to enter down into a central opening in a cube;

central supporting means carried at the bottom of said vertically elongated central member for extending beneath, and supporting, the four stacks in the cube; and means for locking the central supporting means in supporting position and releasing the central supporting means.

26. A pickup head as claimed in claim 25, in which:

said central supporting means comprise four central fingers pivotally secured to the bottom of said vertically elongated central member in a position whereby, upon the pickup head being lowered over a cube, the four central fingers engage a surface supporting the cube and are cammed into respective supporting positions extending outwardly in four respective directions toward the four side panels.

27. A pickup head as claimed in claim 26, in which:

each of said four central fingers carries a respective roller adapted to roll against a surface supporting the cube for aiding in camming the four central fingers into their respective supporting positions.

28. A pickup head as claimed in claim 25, in which:

said vertically elongated central member is removable from the pickup head.

29. A pickup head adapted to be raised, lowered an moved by a transporter into various horizontally displaced locations for grasping, lifting and transporting a cube formed by four stacks of printed products each of which has been folded to form a spine extending along one margin and wherein the four stacks are of similar height and are abutting one another in the cube which has a substantially square perimeter as seen in top plan view and wherein each of the four stacks is positioned with spines of printed products therein oriented in a respective direction at 90° relative to spines of printed products in two respective adjoining stacks, said pickup head comprising:

mounting means engageable by said transporter;

four vertically depending side panels carried by said mounting means;

said four side panels being arranged in two pairs, with each pair including two opposed parallel side panels;

the two opposed parallel side panels in one pair being oriented perpendicular to the two opposed side panels in the other pair;

the two opposed parallel side panels in each pair being movable toward and away from each other for collectively confining a four-sided volume of variable dimensions;

means for moving the two opposed parallel side panels of each pair toward and away from each other;

means carried at the bottom of each of said side panels for extending beneath, and supporting, a cube of four stacks of printed products to be lifted;

means for holding the respective supporting means of each side panel in supporting position and for retracting the supporting means; and a plurality of vacuum cups mounted at the bottom of each of said side panels for engaging and lifting a separator sheet for placing the separator sheet upon previously transported cubes in preparation for placing other transported cubes upon the separator sheet.

* * * * *